US012714982B2

(12) United States Patent
Park et al.

(10) Patent No.: US 12,714,982 B2
(45) Date of Patent: Aug. 25, 2026

(54) SUPER ABSORBENT POLYMER

(71) Applicant: LG Chem, Ltd., Seoul (KR)

(72) Inventors: Sung Soo Park, Daejeon (KR); Kwangin Shin, Daejeon (KR); Heechang Woo, Daejeon (KR); Junwye Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/922,611

(22) Filed: Oct. 22, 2024

(65) Prior Publication Data

US 2025/0170556 A1 May 29, 2025

(30) Foreign Application Priority Data

Nov. 24, 2023 (KR) ........................ 10-2023-0165503

(51) Int. Cl.
*B01J 20/26* (2006.01)
*B01J 20/28* (2006.01)
*C08F 220/06* (2006.01)

(52) U.S. Cl.
CPC ....... *B01J 20/261* (2013.01); *B01J 20/28004* (2013.01); *B01J 20/28011* (2013.01); *B01J 20/28016* (2013.01); *C08F 220/06* (2013.01)

(58) Field of Classification Search
CPC .................................................. B01J 20/28011
See application file for complete search history.

(56) References Cited

U.S. PATENT DOCUMENTS 5,338,766 A 8/1994 Phan et al.
6,319,558 B1 11/2001 Willemsen
10,994,260 B2 5/2021 Kovacic et al.
2005/0003191 A1 1/2005 Ehrnsperger et al.
2005/0239942 A1 10/2005 Herfert et al.
2006/0020053 A1 1/2006 Flohr et al.
2007/0264489 A1 11/2007 Sasabe et al.
2008/0021150 A1 1/2008 Becker et al.
2008/0075937 A1 3/2008 Wada et al.
2008/0140037 A1 6/2008 Newman
2010/0216938 A1 8/2010 Becker et al.
2012/0220452 A1 8/2012 Matsumoto et al.
2013/0026412 A1 1/2013 Machida et al.
2013/0102750 A1 4/2013 Watanabe et al.
2013/0136713 A1 5/2013 Terada et al.
2013/0175473 A1 7/2013 Wada et al.
2014/0031203 A1 1/2014 Kondo et al.
2014/0031473 A1 1/2014 Nogi et al.
2015/0299404 A1 10/2015 Daniel et al.
2015/0307681 A1 10/2015 Park et al.
2015/0322180 A1 11/2015 Matsumoto et al.
2016/0208035 A1 7/2016 Ryu et al.
2017/0014801 A1 1/2017 Ikeuchi et al.
2017/0073478 A1 3/2017 Joo et al.
2017/0189575 A1 7/2017 Lee et al.
2017/0216817 A1 8/2017 Torii et al.
2017/0233534 A1 8/2017 Kim et al.
2017/0312148 A1 11/2017 Dobrosielska-Oura et al.
2018/0021437 A1 1/2018 Kim et al.
2018/0037686 A1 2/2018 Lee et al.
2018/0243464 A1 8/2018 Hwang et al.
2019/0099739 A1 4/2019 Lee et al.
2019/0308171 A1* 10/2019 Kim ......................... C08J 3/245
2019/0344243 A1 11/2019 Lee et al.
2020/0085716 A1 3/2020 Mehling et al.
2020/0139344 A1 5/2020 Kim et al.
2020/0247958 A1* 8/2020 Park ........................... C08J 3/12
2021/0008521 A1* 1/2021 Choi .................. B01J 20/28028
2021/0033516 A1 2/2021 Toennessen et al.
2021/0040271 A1 2/2021 Lee et al.
2021/0100684 A1 4/2021 Kitabata et al.
2021/0113989 A1 4/2021 Hur et al.
2021/0121852 A1 4/2021 Herfert et al.
2021/0154637 A1 5/2021 Pfeiffer et al.
2021/0244844 A1 8/2021 Chan et al.
2021/0309777 A1* 10/2021 Lee ............................ C08J 3/24
2021/0362126 A1 11/2021 Bauer et al.
2022/0088568 A1 3/2022 Kimura et al.
2022/0184579 A1 6/2022 Yan et al.
2023/0102961 A1 3/2023 Nishimura et al.
2023/0330629 A1* 10/2023 Won ................... B01J 20/28047
2023/0338925 A1 10/2023 Chung et al.
2023/0347317 A1* 11/2023 Yoon ........................ C08K 3/26
2023/0374232 A1* 11/2023 Ryu ....................... C08K 5/098
2023/0381744 A1 11/2023 Woo et al.
2024/0238759 A1* 7/2024 Ryu ....................... C08K 5/098
2024/0261762 A1* 8/2024 Kim .................. B01J 20/28016
2024/0278210 A1 8/2024 Lee et al.

(Continued)

FOREIGN PATENT DOCUMENTS

CA 2319786 A1 8/1999
CN 001136355 C 1/2004

(Continued)

OTHER PUBLICATIONS

Zhang, S. et al., “Predicting the Swelling Behavior of Acrylic Superabsorbent Polymers Used in Diapers” Wiley, Hindawi, Advances in Polymer Technology, Dec. 2021, pp. 1-7, vol. 2021.
Shi, M et al., “The Development of a Polysaccharide-Based Hydrogel Encapsulating Tobramycin-Loaded Gelatine Microspheres as an Antibacterial System” MDPI, GELS, Mar. 2023, pp. 1-15, vol. 9, No. 219.
International Search Report for Application No. PCT/KR2024/018688 mailed Mar. 7, 2025. 5 pages. (see p. 2-4, categorizing the cited references).
International Search Report for Application No. PCT/KR2024/018689 mailed Mar. 7, 2025. 5 pages. (see p. 2-4, categorizing the cited references).
International Search Report for Application No. PCT/KR2025/002375 mailed Jun. 2, 2025. 3 pages.
George Odian, “Principles of Polymerization” , Wiley-Interscience, Feb. 2004. 839 pages.

(Continued)

*Primary Examiner* — Liam J Heincer
(74) *Attorney, Agent, or Firm* — Lerner David LLP

(57) ABSTRACT

The present disclosure relates to a super absorbent polymer exhibiting an improved absorption rate and improved absorption performance.

10 Claims, 4 Drawing Sheets

(56) References Cited

U.S. PATENT DOCUMENTS

| | | | |
|---|---|---|---|
| 2024/0278211 A1 | 8/2024 | Han et al. | |
| 2024/0351003 A1 | 10/2024 | Nam et al. | |

FOREIGN PATENT DOCUMENTS

| | | | | |
|---|---|---|---|---|
| EP | 1024176 A1 | 8/2000 | | |
| EP | 3270857 B1 | 12/2019 | | |
| EP | 4137534 A1 | 2/2023 | | |
| EP | 4206244 A1 | 7/2023 | | |
| EP | 4253451 A1 | 10/2023 | | |
| EP | 4321559 A1 | 2/2024 | | |
| EP | 4321561 A1 | 2/2024 | | |
| JP | H08122284 A | 5/1996 | | |
| JP | 2001106728 A | 4/2001 | | |
| JP | 2002504568 A | 2/2002 | | |
| JP | 2005097569 A | 4/2005 | | |
| JP | 3745539 B2 | 2/2006 | | |
| JP | 2006527641 A | 12/2006 | | |
| JP | 2007512405 A | 5/2007 | | |
| JP | 2009057496 A | 3/2009 | | |
| JP | 4261853 B2 | 4/2009 | | |
| JP | 4284767 B2 | 6/2009 | | |
| JP | 4908545 B2 | 4/2012 | | |
| JP | 2012097273 A | 5/2012 | | |
| JP | WO2012144564 A1 | 7/2014 | | |
| JP | 5616437 B2 | 10/2014 | | |
| JP | 5692844 B2 | 4/2015 | | |
| JP | 2015120933 A | 7/2015 | | |
| JP | 5913423 B2 | 4/2016 | | |
| JP | 2017185485 A | 10/2017 | | |
| JP | 2017531531 A | 10/2017 | | |
| JP | 2018510041 A | 4/2018 | | |
| JP | 2021510320 A | 4/2021 | | |
| JP | 6890190 B2 | 6/2021 | | |
| JP | 6950158 B2 | 10/2021 | | |
| JP | 6959030 B2 | 11/2021 | | |
| JP | 7181948 B2 | 12/2022 | | |
| JP | 7270828 B2 | 5/2023 | | |
| JP | 7362653 B2 | 10/2023 | | |
| KR | 100317398 B1 | 11/2002 | | |
| KR | 20050036974 A | 4/2005 | | |
| KR | 20070039050 A | 4/2007 | | |
| KR | 20070048226 A | 5/2007 | | |
| KR | 20070083761 A | 8/2007 | | |
| KR | 2013-0097771 A | 9/2013 | | |
| KR | 20140063116 A | 5/2014 | | |
| KR | 20150062959 A | 6/2015 | | |
| KR | 20150087368 A | 7/2015 | | |
| KR | 20150142636 A | 12/2015 | | |
| KR | 20150143181 A | 12/2015 | | |
| KR | 20160127742 A | 11/2016 | | |
| KR | 101700354 B1 | 1/2017 | | |
| KR | 20170020113 A | 2/2017 | | |
| KR | 20170033634 A | 3/2017 | | |
| KR | 20170063818 A | 6/2017 | | |
| KR | 20170111295 A | 10/2017 | | |
| KR | 101812895 B1 | 12/2017 | | |
| KR | 101848470 B1 | 4/2018 | | |
| KR | 20180073334 A | 7/2018 | | |
| KR | 20180074384 A | 7/2018 | | |
| KR | 101908142 B1 | 10/2018 | | |
| KR | 101918647 B1 | 11/2018 | | |
| KR | 20190012809 A | 2/2019 | | |
| KR | 20190016534 A | 2/2019 | | |
| KR | 101989142 B1 | 6/2019 | | |
| KR | 20190072406 A | 6/2019 | | |
| KR | 102094453 B1 | 3/2020 | | |
| KR | 20200051565 A | 5/2020 | | |
| KR | 20200062012 A | 6/2020 | | |
| KR | 20200073044 A | 6/2020 | | |
| KR | 20200123127 A | 10/2020 | | |
| KR | 102322774 B1 | 11/2021 | | |
| KR | 20220046497 A | 4/2022 | | |
| KR | 20220049961 A | 4/2022 | | |
| KR | 20220068184 A | 5/2022 | | |
| KR | 20220088351 A | 6/2022 | | |
| KR | 20220169431 A | 12/2022 | | |
| KR | 20220169437 A | 12/2022 | | |
| KR | 20220169444 A | 12/2022 | | |
| KR | 102568226 B1 | 8/2023 | | |
| KR | 20230120110 A | 8/2023 | | |
| KR | 102578740 B1 | 9/2023 | | |
| KR | 102584470 B1 | 10/2023 | | |
| KR | 20240014710 A | 2/2024 | | |
| WO | WO-2022108430 A1 | * | 5/2022 | B01J 20/261 |
| WO | WO-2022131838 A1 | * | 6/2022 | C08F 20/06 |
| WO | 2022265459 A1 | 12/2022 | | |
| WO | 2022265466 A1 | 12/2022 | | |
| WO | 2022265472 A1 | 12/2022 | | |
| WO | 2022265473 A1 | 12/2022 | | |
| WO | 2022265477 A1 | 12/2022 | | |

OTHER PUBLICATIONS

International Search Report for Application No. PCT/KR2025/002377 mailed May 26, 2025. 3 pages.

International Search Report for Application No. PCT/KR2025/095022 mailed Jul. 4, 2025. 3 pages.

Menceloglu, Y., et al., "Triblock Superabsorbent Polymer Nanocomposites with Enhanced Water Retention Capacities and Rheological Characteristics", ACS Omega, vol. 7, Issue 24, pp. 20486-20494, Jun. 8, 2022.

Kim, Hae Chan, "Superabsorbent polymer with enhanced gel strength and heat resistance using itaconic acid-based oligomer", Polymers for Advanced Technologies, vol. 34, pp. 2564-2572, Apr. 25, 2023.

Situ, Y, et al., "Synthesis and application of super absorbent polymers synthesized with ammonia solution and diatomaceous earth with low toxic residues" Environmental Technology & Innovation, Oct. 2023, pp. 1-12, vol. 32.

Kwon, Y.R."Surface-crosslinking of itaconic acid-based superabsorbent polymer using a novel bio-based surface- crosslinker based on succinic acid"Polymer-Plastics Technology and Materials, Taylor & Francis, Mar. 2023, pp. 1057-1066, vol. 62, Issue 8.

Sharma, S et al., " Superabsorbent Polymer Gels based on Polyaspartic Acid and Polyacrylic Acid" Journal of Material Science & Engineering, Feb. 2016, pp. 1-7, vol. 5, Issue 3.

International Search Report for Application No. PCT/KR2025/006678 mailed Aug. 29, 2025, 11 pages.

International Search Report for Application No. PCT/KR2025/006025 mailed Aug. 6, 2025, 13 pages.

International Search Report for Application No. PCT/KR2025/006542 mailed Aug. 27, 2025, 9 pages.

International Search Report for Application No. PCT/KR2025/006675 mailed Aug. 27, 2025, 9 pages.

Kim, S., et al. Preparation of Surface-Reinforced Superabsorbent Polymer Hydrogel Microspheres via Incorporation of In Situ Synthesized Silver Nanoparticles. Polymers. Mar. 2021; 13(6):902. https://doi.org/10.3390/polym13060902.11 pgs.

* cited by examiner

Sample Dispersion Unit

☑ Use SDU

Default Dispersion Settings

Low Energy

High Energy

Injection Pressure (bar)

1.0

Injection Time (ms)

20

Settling Time (sec)

60

Injection Volume Indicator

SUPER ABSORBENT POLYMER

CROSS-REFERENCE TO RELATED APPLICATION

This application claims priority to Korean Patent Application No. 10-2023-0165503 filed on Nov. 24, 2023, and all the benefits accruing therefrom under 35 U.S.C. § 119, the content of which is incorporated by reference in its entirety.

TECHNICAL FIELD

The present disclosure relates to a super absorbent polymer exhibiting an improved absorption rate and improved absorption performance.

BACKGROUND

A super absorbent polymer (SAP) is a synthetic polymer material that has the function to absorb moisture of an amount of 500 to 1,000 times the weight of the synthetic polymer material itself. It has various names by development companies, for example, super absorbency material (SAM) and absorbent gel material (AGM). Such super absorbent polymers as described above have begun to be commercialized for diapers, sanitary products, and the like, and they are currently widely used as materials for a soil water retaining agent for gardening, a water-stop material for civil engineering or construction, a sheet for raising seedlings, a freshness maintaining agent in the food distribution field, a poultice, and the like.

These super absorbent polymers are widely used in the field of sanitary goods such as a diaper and a sanitary pad. In general, the super absorbent polymer is included in sanitary goods, in a state of being spread within the pulp. However, in recent years, efforts have continued to provide sanitary goods such as diapers having a thinner thickness, and as part of the effort, development is actively underway for so-called pulpless diapers and the like, in which the content of pulp is reduced or, furthermore, no pulp is used at all.

In a case of such sanitary goods in which the content of pulp is reduced or pulp is not used, a relatively high proportion of super absorbent polymer is contained, and thus particles of the super absorbent polymer are inevitably contained in a multilayered manner in the sanitary good. In order for the whole particles of the super absorbent polymer contained in a multilayered manner to more efficiently absorb a large amount of liquid such as urine, the super absorbent polymer needs to exhibit basically not only high absorption performance but also a high absorption rate. On the other hand, the most general method to increase these absorption properties includes a method of forming a porous structure the inside of the super absorbent polymer to widen the surface area of the super absorbent polymer, where the generally adopted method is a method in which a monomer composition is allowed to contain a foaming agent in order to increase the surface area of the super absorbent polymer, whereby a porous structure is formed within the base resin powder as crosslinking and polymerization progress.

However, the use of the foaming agent has disadvantages in that the overall physical properties of the super absorbent polymer, such as surface tension, liquid permeability, or bulk density, are reduced, and the amount of fine powder to be generated increases. As a result, there is a continuous demand for the development of technology that makes it possible to improve the absorption properties of the super absorbent polymer without using a foaming agent.

As a result, there is a continuous demand for the development of technology that makes it possible to produce a super absorbent polymer, without generating fine powder so that these limitations may be solved fundamentally.

SUMMARY

The present disclosure aims to provide a super absorbent polymer that, while having a high absorption rate, simultaneously improves water retention capacity and absorption performance such as absorbency under pressure by adjusting the convexity and solidity of particles to a predetermined value, whereby it is possible to achieve excellent quality when the polymer is applied to actual products.

In accordance with an exemplary aspect of the present disclosure, the present disclosure provides a super absorbent polymer that is a polyacrylic acid (salt)-based super absorbent polymer, where for all particles, an average value of convexity, which is calculated according to Expression 1 below, is approximately 0.92 or less, and an average value of solidity, which is calculated according to Expression 2 below, is approximately 0.94 or less, and an absorbency under pressure (AUP), which is measured at approximately 2.07 kPa (0.3 psi) according to an EDANA method WSP 242.3, is approximately 28 g/g or more:

convexity=convex hull perimeter/perimeter of actual particle <Expression 1> solidity=area of region surrounded by perimeter of actual particle/area of region surrounded by convex hull perimeter, <Expression 2> in the expression, the perimeter of the convex outer surface (convex hull perimeter) means a length of an imaginary elastic band that stretches around an outline of an image obtained by capturing a 2D image of a three-dimensional particle to be measured, and the perimeter of the actual particle means an actual perimeter length of the image obtained by capturing the 2D image of the three-dimensional particle to be measured.

BRIEF DESCRIPTION OF THE DRAWINGS

Exemplary aspects can be understood in more detail from the following description taken in conjunction with the accompanying drawings, in which.

DETAILED DESCRIPTION

Figure 1:
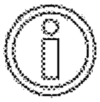
FIG. 1 shows setting values of a Sample Dispersion Unit in morphologi 4 from Malvern Panalytical.
Figure 1:
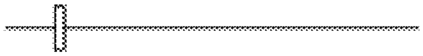
Figure 1:
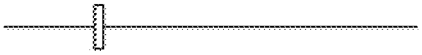
Figure 1:
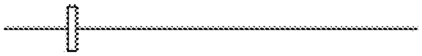
Figure 1:
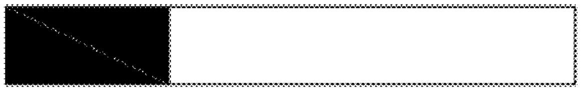
Figure 1:
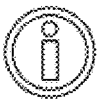

In the present specification, all technical terms and scientific terms are used only to describe exemplary examples unless otherwise defined and thus are not intended to limit the present disclosure. A singular expression includes a plural expression unless it is definitely different contextually. In the present specification, the term such as "including/containing", "equipped", or "having" is intended to designate the presence of implemented features, numbers, steps, constitutional element, or a combination thereof, and thus it should be understood that this does not exclude in advance the presence of one or more other features, numbers, steps, constitutional element, or a combination thereof or addition possibilities.

Since the present disclosure may be subjected to various modifications and may have various forms, specific aspects will be exemplified and described in detail below. However, this is not intended to limit the present disclosure to a specific disclosed form and thus should be understood to include all changes, equivalents, and substitutes, which are included in the spirit and technical scope described above.

The terminology that is used in the present specification is only intended to refer to a specific exemplary aspect and thus is not intended to limit the present disclosure. In addition, singular forms as used herein includes plural forms unless phrases clearly indicate the opposite.

The term "polymer" or "polymeric molecule" that is used in the specification of the present disclosure means such as one that is a state in which a water-soluble ethylene-based unsaturated monomer is polymerized, and it may encompass those in all moisture content ranges or particle diameter ranges.

In addition, the term "super absorbent polymer" means, depending on the context, a crosslinked polymer or a base resin having a powder form, in which the crosslinked polymer is made of pulverized particles of the super absorbent polymer, or it is used to encompass all substances that have been made suitable for commercialization by subjecting the crosslinked polymer or the base resin to additional processes, such as drying, pulverization, classification, and surface crosslinking.

In addition, the term "fine powder" means particles having a particle diameter of less than 150 μm among the particles of the super absorbent polymer. The particle diameter of such resin particles may be measured according to the European Disposables and Nonwovens Association (EDANA) standard EDANA WSP 220.3 method.

In addition, the term "chopping" refers to cutting a hydrous gel polymer into small pieces of the millimeter scale in order to increase drying efficiency and is used to be separated from carrying out pulverization to the micrometer or normal particle level.

In addition, the term "micronizing (micronization)" refers to pulverizing a hydrous gel polymer to have a particle diameter of tens to hundreds of micrometers and is used to be separated from "chopping"

Hereinafter, a super absorbent polymer and a production method thereof, according to specific aspects of the disclosure, will be described in more detail.

I. Polyacrylic Acid (Salt)-Based Super Absorbent Polymer

The hydrous gel polymer obtained through the polymerization reaction of acrylic acid-based monomer undergoes processes such as drying, pulverization, classification, and surface crosslinking, and is sold as a powder-shaped super absorbent polymer. Recently, attempts have been made continuously to provide a super absorbent polymer having an improved absorption rate.

The most general method to increase the absorption rate includes a method of forming a porous structure in the inside of the super absorbent polymer to widen the surface area of the super absorbent polymer, where the generally adopted method is a method in which a monomer composition is allowed to contain a foaming agent in order to increase the surface area of the super absorbent polymer, whereby a porous structure is formed within the base resin powder as crosslinking and polymerization progress.

However, the method in the related art has a problem in that it is difficult to form a sufficient surface area. As a result, the unabsorbed body fluid flows into the inside of the sanitary good or leaks to the outside during the actual urination time, which causes discomfort to the user.

In order to solve such limitations in the related art, as described above, the convexity and solidity were adjusted to a predetermined value, thereby confirming that, while the improving absorption rate, it is possible to simultaneously improve water retention capacity and absorption performance such as absorbency under pressure, and thus it is possible to achieve excellent quality in a case where the resin is applied to actual products, whereby the present disclosure was completed.

According to an aspect of the present disclosure, there is provided a super absorbent polymer that is a polyacrylic acid (salt)-based super absorbent polymer, where for all particles, an average value of convexity, which is calculated according to Expression 1 below, is approximately 0.92 or less, and an average value of solidity, which is calculated according to Expression 2 below, is approximately 0.94 or less, and an absorbency under pressure (AUP), which is measured at approximately 2.07 kPa (0.3 psi) according to an EDANA method WSP 242.3, is approximately 28 g/g or more:

Convexity=convex hull perimeter/perimeter of actual particle <Expression 1>

Solidity=area of region surrounded by perimeter of actual particle/area of region surrounded by convex hull perimeter. <Expression 2>

In the expression, the perimeter of the convex outer surface (convex hull perimeter) means a length of an imaginary elastic band that stretches around an outline of an image obtained by capturing a 2D image of a three-dimensional particle to be measured, and the perimeter of the actual particle means an actual perimeter length of the image obtained by capturing the 2D image of the three-dimensional particle to be measured. In other words, the convex hull perimeter refers to the length of a perimeter of a polygon of minimal perimeter that surrounds the 2D image of the three-dimensional particle to be measured, and the perimeter of actual particle refers to the length of a perimeter of the 2D image of the three-dimensional particle to be measured.

The term "all particles" refers to super absorbent polymer particles without any limitation on particle size.

In a case where each of the convexity and the solidity of particles of the super absorbent polymer are adjusted to a predetermined value, it is possible to simultaneously improve water retention capacity and other absorption performance such as absorbency under pressure while improving the absorption rate of the super absorbent polymer by widening the specific surface area, whereby the present disclosure was completed.

Specifically, it was confirmed that in a case of quantifying the shape of the particle of the super absorbent polymer which affects the absorption rate and the absorption performance, and then considering solidity as a parameter that makes it possible to determine the roughness of the surface of the particle of the super absorbent polymer and considering convexity as a parameter that makes it possible to determine the degree of overall protrusion of the particle, thereby making each of these parameters have a value at a specific level, the superabsorbent resin can exhibit a high water absorption rate and a balance between improved water retention capacity and improved absorbency under pressure.

The convexity is a parameter for measuring the outline of the particle and the surface roughness of the particle, and it is calculated according to Expression 1 below:

Convexity=convex hull perimeter/perimeter of actual particle. <Expression 1>

In the expression, the perimeter of the convex outer surface (convex hull perimeter) means a length of an imaginary elastic band that stretches around an outline of an image obtained by capturing a 2D image of a three-dimensional particle to be measured, and the perimeter of the actual particle means an actual perimeter length of the image obtained by capturing the 2D image of the three-dimensional particle to be measured. In other words, the convex hull perimeter refers to the length of a perimeter of a polygon of minimal perimeter that surrounds the 2D image of the three-dimensional particle to be measured, and the perimeter of actual particle refers to the length of a perimeter of the 2D image of the three-dimensional particle to be measured.

The value of the convexity has a value of 0 to 1, where a particle is regarded as having a very smooth outline in a case where the convexity is close to 1, and a particle is regarded as having a rough or uneven outline in a case where the convexity is close to 0.

In this case, the average value of the convexity is measured after scattering particles on a stage in a measuring instrument by vacuum with any method, and the n number of 200 or more is secured, and then the average value is derived as a statistical result.

The solidity is a parameter for measuring the degree of overall protrusion of the particle, and it is calculated according to Expression 2 below:

Solidity=area of region surrounded by perimeter of actual particle/area of region surrounded by convex hull perimeter. <Expression 2>

In the expression, the perimeter of the actual particle and the perimeter of the convex outer surface are as described above.

The value of the solidity also has a value of 0 to 1, where a particle may be regarded as having an overall smooth and convex shape since the degree of protrusion of the particle decreases in a case where the solidity is close to 1, and a particle may be regarded as having an increased degree of concaveness of the overall shape since the degree of protrusion of the particle increases in a case where the solidity is close to 0.

The average value of the solidity is likewise measured after scattering particles on a stage in a measuring instrument by vacuum with any method, and the n number of 200 or more is secured, and then the average value is derived as a statistical result.

The convexity and the solidity are similar in that the shape of the particle of the super absorbent polymer is quantified; however, they are parameters having meanings different from each other.

In other words, even in a case of particles having the same value of solidity, the value of convexity may differ depending on the degree of roughness of the particle surface, for example, the degree of increase in surface area according to the number of protruding portions. For example, in a case where the shape of the particle is different, both the convexity value and the solidity value may be different, or only any of them may be different.

Therefore, in order for the super absorbent polymer to exhibit a high water absorption rate and a balance between improved water retention capacity and improved absorbency under pressure, both convexity and solidity need to satisfy a value at a specific level.

These parameters may be measured using several commercial instruments that quantify and analyze the morphology of particles based on image analysis of the particles. For example, the above parameters may be measured with morphologi 4 from Malvern Panalytical, and specifically, may be measured according to the following four steps, which will be described in more detail in the experimental examples described below.

1) Specimen preparation: Particles of a super absorbent polymer to be measured are prepared. In this case, in a case of aiming to measure the convexity and solidity of particles having a particle diameter in a specific range, the particles having a specific particle diameter are classified at an amplitude of 1.0 for 10 minutes using a classifier from Retsch GmbH, whereby a specimen is prepared.

In this case, the particle diameter of particles of the super absorbent polymer may be measured according to the European Disposables and Nonwovens Association (EDANA) standard EDANA WSP 220.3 method.

2) Image acquisition: The prepared specimen is set on the stage in the equipment and then scanned at a magnification of 2.5 to obtain images of individual particles.

3) Image processing: For the acquired images, parameter values of the circle equivalent diameter (CE diameter), the shortest diameter, the longest diameter, the perimeter of the actual particle, the perimeter of the convex outer surface (convex hull perimeter), and the like are measured in an image of each particle, where the image is obtained by capturing a 2D image of the three-dimensional particle to be measured.

4) Based on the data analyzed for each particle, the shape data values for all particles included in the sample are obtained.

The super absorbent polymer described above is such that for all the particles subjected to the measurement, the average value of the convexity is 0.92 or less, and the average value of the solidity is 0.94 or less.

In a case where the average value of convexity of all particles of the super absorbent polymer exceeds approximately 0.92, the pore structure within the particles is not developed or the particles have a smooth surface, and thus there is a risk that the absorption rate of the super absorbent polymer may be reduced. In addition, in a case where the average value of the solidity exceeds approximately 0.94, the degree of protrusion of the particle decreases and thus the particles of the super absorbent polymer may not immobilized in the inside of the absorption core and may flow. Therefore, there may be a problem of quality deterioration in a case where the super absorbent polymer is used in sanitary goods such as diapers.

Specifically, for example, the average value of convexity of all particles of the super absorbent polymer may be approximately 0.92 or less while being approximately 0.80 or more, approximately 0.83 or more, approximately 0.85 or more, or approximately 0.87 or more.

A particle may be regarded as having a small specific surface area in a case where the average value of the convexity is small. However, in a case where only the specific surface area is simply increased, the coating may be ununiform in a case where particles of the super absorbent polymer are mixed with a surface crosslinking liquid, and thus the absorbency under pressure may be reduced. Alternatively, in a case where the charging amount of surface crosslinking liquid is increased to increase coating efficiency may cause a problem in that water retention capacity and absorption performance such as absorbency under pressure deteriorate.

Therefore, in order to simultaneously improve the absorption rate and the absorption performance so that an excellent balance of physical properties is obtained, the average value of convexity of all particles of the super absorbent polymer may be approximately 0.80 or more.

The average solidity of all particles of the super absorbent polymer may be approximately 0.94 or less while being approximately 0.78 or more, approximately 0.80 or more, approximately 0.83 or more, or approximately 0.85 or more.

A particle may be regarded as having an increased specific surface area since the degree of overall protrusion of the particle increases in a case where the average value of the solidity is small. However, likewise, a case of simply increasing only the specific surface area may cause a problem in that water retention capacity and absorption performance such as absorbency under pressure deteriorate.

Therefore, in order to simultaneously improve the absorption rate and the absorption performance so that an excellent balance of physical properties is obtained, the average value of convexity of all particles of the super absorbent polymer may be approximately 0.78 or more.

In addition, the particles of the super absorbent polymer according to the present disclosure are such that for all the particles subjected to the measurement, the average value of the convexity satisfies a value of approximately 0.92 or less, and at the same time, the average value of the solidity satisfies a value of approximately 0.94 or less.

As described above, in a case where the shape of the particle is different, both the convexity value and the solidity value may be different, or only any of them may be different. However, in a case where both values satisfy a value at a specific level, the roughness of the particle surface increases, and thus the specific surface area increases and at the same time, the degree of protrusion of the particle increases. As a result, the absorption rate and the absorption performance of the super absorbent polymer can be improved at the same time, which makes it possible to implement a super absorbent polymer having a balance of physical properties.

On the other hand, the ratio of the convexity of particles having a particle diameter of approximately 300 μm to approximately 600 μm to the convexity of all particles may be approximately 1.1 or less, approximately 1.05 or less, or approximately 1.03 or less while being approximately 0.9 or more, approximately 0.93 or more, or approximately 0.95 or more.

The convexity may be measured by separating, from others, particles having a particle diameter of approximately 300 μm to approximately 600 μm in the super absorbent polymer. In this case, the ratio of the convexity of particles having a particle diameter of approximately 300 μm to approximately 600 μm to the convexity of all particles may be calculated, it means that in a case where the ratio of the convexity of particles having a particle diameter of approximately 300 μm to approximately 600 μm to the convexity of all particles is close to 1, particles have a similar surface roughness in the super absorbent polymer regardless of the size of the particle diameter.

In addition, the ratio of the solidity of particles having a particle diameter of approximately 300 μm to approximately 600 μm to the solidity of all particles may be approximately 1.1 or less, approximately 1.05 or less, or approximately 1.03 or less while being approximately 0.9 or more, approximately 0.93 or more, or approximately 0.95 or more.

Likewise, the solidity may be measured by separately separating, from others, particles having a particle diameter of approximately 300 μm to approximately 600 μm in the super absorbent polymer. In this case, it means that in a case where the ratio of the solidity of particles having a particle diameter of approximately 300 μm to approximately 600 μm to the solidity of all particles is close to 1, particles have a similar degree of overall protrusion in the super absorbent polymer regardless of the size of the particle diameter.

The average value of circle equivalent diameters (CE diameters) of the super absorbent polymer may be approximately 220 μm to approximately 400 μm.

The CE diameter means a diameter of a circle that has the same area as a particle depicted in an image obtained by capturing a 2D image of the three-dimensional particle to be measured, and the size of the particle may be indicated through the CE diameter.

However, since particles having different shapes may have the same CE diameter value, the shape of the particle may be indicated through the convexity and solidity of the particle in addition to the CE diameter.

The average value of the CE diameter of the super absorbent polymer may be approximately 400 μm or less, approximately 350 μm or less, approximately 330 μm or less, approximately 320 μm or less, or approximately 310 μm or less while being approximately 220 μm or more, approximately 230 μm or more, or approximately 240 μm or more.

In a case where the average value of the CE diameter of the super absorbent polymer is less than approximately 220 μm, the amount of fine powder to be generated may increase due to a lot of micronized particles, and there is a risk that the absorption characteristics may deteriorate, and in a case where it exceeds approximately 400 μm, there may be a problem that the absorption rate decreases. Therefore, the average value of the CE diameter of the super absorbent polymer may be within the above-described range.

In this case, the average value of the CE diameter is measured after scattering particles on a stage in a measuring instrument by vacuum with any method, and the n number of 200 or more is secured, and then the average value is derived as a statistical result.

In addition, a super absorbent polymer produced according to an aspect of the present disclosure may have a uniform particle diameter distribution, thereby being configured to be capable of providing a super absorbent polymer having excellent overall absorption properties such as water retention capacity and absorbency under pressure, and excellent rewet characteristics, The super absorbent polymer according to an aspect of the present disclosure has a high absorption rate and a low content of fine powder, and may have water retention capacity (CRC) and absorbency under pressure (AUP) as overall absorption properties, which are at the same level or higher level as compared with those of a super absorbent polymer produced according to a method in the related art.

In addition, the roughness of the particle surface and the degree of overall protrusion of the particle may have similar values regardless of the particle size, and the low content of water-soluble component (EC) makes it possible to provide a super absorbent polymer having excellent liquid permeability and rewet properties.

Specifically, in the super absorbent polymer according to the present disclosure, a water retention capacity (CRC) measured according to the EDANA method WSP 241.3 may have a value in a range of approximately 50 g/g or less, approximately 45 g/g or less, or approximately 40 g/g or less while being approximately 33 g/g or more, approximately 34 g/g or more, or approximately 35 g/g or more.

In addition, in the super absorbent polymer according to the present disclosure, an absorbency under pressure (AUP) at approximately 2.07 kPa (0.3 psi), which is measured according to an EDANA method WSP 242.3, may have a value in a range of approximately 45 g/g or less, approximately 42 g/g or less, or approximately 40 g/g or less while being approximately 28 g/g or more, approximately 29 g/g or more, or approximately 30 g/g or more.

In addition, in the super absorbent polymer according to the present disclosure, an effective absorption capacity (EFFC), which is calculated according to Expression 3 below, may be approximately 40 g/g or less, approximately 39 g/g or less, approximately 38 g/g or less, approximately 37 g/g or less, or approximately 36 g/g or less while being approximately 30 g/g or more, approximately 31 g/g or more, approximately 32 g/g or more, or approximately 33 g/g or more.

Effective absorption capacity (EFFC)={water retention capacity (CRC)+absorbency under pressure (AUP) at approximately 2.07 kPa (0.3 psi)}/2 <Expression 3>

The effective absorption capacity (EFFC) is an arithmetic average value of the water retention capacity (CRC) and the absorbency under pressure (AUP) at approximately 2.07 kPa (0.3 psi), where it may be calculated from the measured CRC and AUP.

In addition, in the super absorbent polymer according to the present disclosure, a content of a water-soluble component, which is measured after swelling for 1 hour according to the EDANA method WSP 270.3, may be approximately 5% by weight or less, approximately 4.8% by weight or less, approximately 4.5% by weight or less, approximately 4.3% by weight or less, approximately 4% by weight or less, or approximately 3.9% by weight or less. The smaller the content of the water-soluble component, the better it is. The lower limit thereof is theoretically approximately 0% by weight; however, it may be, for example, approximately 0.1% by weight or more, or approximately 1% by weight or more.

In the super absorbent polymer according to the present disclosure, a vortex time may be approximately 40 seconds or less, where the vortex time is measured by a vortex measuring method at approximately 24.0° C. The vortex measuring method is described in detail in the Examples below.

More specifically, the vortex time may be approximately 40 seconds or less, approximately 35 seconds or less, approximately 33 seconds or less, or approximately 30 seconds or less. In addition, the smaller the value of the vortex time is, the more excellent it is. The lower limit of the vortex time is theoretically 0 seconds; however, it may be, for example, approximately 10 seconds or more, approximately 15 seconds or more, or approximately 20 seconds or more.

A method of measuring the water retention capacity, absorbency under pressure, and absorption rate of the super absorbent polymer will be described in more detail in the experimental examples described later.

In addition, in a case where approximately 1 g of the super absorbent polymer according to the present disclosure is swollen with water having an electrical conductivity value of approximately 110 μS/cm for approximately 1 minute, a maximum capacity (free swell capacity) of water that is retainable in the super absorbent polymer may be approximately 230 g or less, approximately 225 g or less, or approximately 220 g or less while being approximately 170 g or more, approximately 175 g or more, approximately 180 g or more, or approximately 185 g or more.

A measuring method for the absorption capacity in water having an electrical conductivity value of approximately 110 μS/cm will be described in more detail in the section regarding experimental examples described later.

On the other hand, the values of convexity and solidity according to the present disclosure may be achieved by adjusting the component/content of the super absorbent polymer, the manufacturing process conditions of the super absorbent polymer, and the like.

The convexity and the solidity may be controlled to have a value in a specific range by adjusting, for example, the kind and content of the monomer composition, and the kind and content of the internal crosslinking agent in the polymerization process, or the kind, charging amount, and charging time of the surfactant, the kind, charging amount, and charging time of the neutralizing agent, the kind, rotation speed, hole size, number of micronization in the micronization device in the neutralization and micronization steps. This will be described in more detail in the section II. Production method for super absorbent polymer.

Hereinafter, each component that makes up the super absorbent polymer will be described in more detail.

A polyacrylic acid (salt)-based super absorbent polymer according to an aspect of the disclosure includes a base resin powder containing a crosslinked polymer of a water-soluble ethylene-based unsaturated monomer having an acidic group and an internal crosslinking agent. The crosslinked polymer may be formed by polymerizing a monomer composition containing components such as a monomer, an internal crosslinking agent, and a polymerization initiator.

Here, the water-soluble ethylene-based unsaturated monomer may be any monomer commonly used in the production of a super absorbent polymer. As a non-limiting example, the water-soluble ethylene-based unsaturated monomer may be a compound represented by Chemical Formula (1):

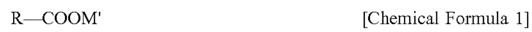

R—COOM' [Chemical Formula 1]

In Chemical Formula 1,

R is an alkyl group having 2 to 5 carbon atoms, which contains an unsaturated bond, and M' is a hydrogen atom, a monovalent or divalent metal, an ammonium group, or an organic amine salt.

In one or more aspects, the monomer may be one or more selected from the group consisting of (meth)acrylic acids, and monovalent (alkali) metal salts, divalent metal salts, ammonium salts, and organic amine salts of these acids.

Such a case where (meth)acrylic acid and/or a salt thereof is used as a water-soluble ethylene-based unsaturated monomer gives an advantage since a super absorbent polymer having improved absorbency may be obtained. In addition, a substance that may be used as the monomer is as follows: maleic anhydride, fumaric acid, crotonic acid, itaconic acid, 2-acryloyl ethanesulfonic acid, 2-methacryloyl ethanesulfonic acid, 2-(meth)acryloyl propanesulfonic acid, or 2-(meth) acrylamide-2-methyl propanesulfonic acid, (meth)acrylamide, N-substituted (meth)acrylate, 2-hydroxyethyl (meth) acrylate, 2-hydroxypropyl (meth)acrylate, methoxypolyethylene glycol (meth)acrylate, polyethylene glycol (meth)acrylate, (N,N)-dimethylaminoethyl (meth) acrylate, (N,N)-dimethylaminopropyl (meth)acrylamide, or the like.

The water-soluble ethylene-based unsaturated monomer has an acidic group. On the other hand, in the production of the super absorbent polymer, a monomer in which at least some of the above-described acidic groups are neutralized by a neutralizing agent is subjected to crosslinking and polymerization to form a polymer. However, in the present disclosure, the acidic group may be neutralized after forming a polymer without being neutralized during polymerization. More specific details about this will be described in the section on the production method for the super absorbent polymer.

The concentration of the water-soluble ethylene-based unsaturated monomer in the monomer composition may be appropriately adjusted in consideration of polymerization time and reaction conditions, and it may be approximately 20% to approximately 60% by weight, or approximately 20% to approximately 40% by weight.

The term 'internal crosslinking agent' that is used in the present specification is a term that is used to distinguish it from a surface crosslinking agent for carrying out crosslinking on the surface of the particle of the super absorbent polymer, which will be described later. The internal crosslinking agent serves to form a polymer containing a crosslinking structure by introducing a crosslink between unsaturated bonds of the water-soluble ethylene-based unsaturated monomers described above.

The crosslinking in the above step is carried out on the surface or in the inside without distinguishing the surface and the inside. However, in a case where a surface crosslinking process for particles of the super absorbent polymer described later is carried out, the surface of the finally produced particles of the super absorbent polymer may include a structure that is newly crosslinked by a surface crosslinking agent, and the structure crosslinked by the internal crosslinking agent may be maintained in the inside of the particles of the super absorbent polymer.

According to an aspect of the present disclosure, the internal crosslinking agent may include any one or more of a multifunctional acrylate-based compound, a multifunctional allyl-based compound, or a multifunctional vinyl-based compound.

Non-limiting examples of the multifunctional acrylate-based compound include ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth) acrylate, tripropylene glycol di(meth)acrylate, polypropylene glycol di(meth)acrylate, butanediol di(meth) acrylate, butylene glycol di(meth)acrylate, hexanediol di(meth)acrylate, pentaerythritol di(meth)acrylate, pentaerythritol tri(meth)acrylate, pentaerythritol tetra(meth) acrylate, dipentaerythritol di(meth)acrylate, dipentaerythritol tri(meth)acrylate, dipentaerythritol tetra(meth)acrylate, dipentaerythritol penta(meth)acrylate, trimethylolpropane di(meth)acrylate, trimethylolpropane tri(meth)acrylate, glycerin di(meth)acrylate, and glycerin tri(meth)acrylate, where one kind of these alone or a mixture of two or more kinds may be used.

Non-limiting examples of the multifunctional allyl compound include ethylene glycol diallyl ether, diethylene glycol diallyl ether, triethylene glycol diallyl ether, tetraethylene glycol diallyl ether, polyethylene glycol diallyl ether, propylene glycol diallyl ether, tripropylene glycol diallyl ether, polypropylene glycol diallyl ether, butanediol diallyl ether, butylene glycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, and glycerin triallyl ether, where one kind of these alone or a mixture of two or more kinds may be used.

Non-limiting examples of the multifunctional vinyl compound include ethylene glycol divinyl ether, diethylene glycol divinyl ether, triethylene glycol divinyl ether, tetraethylene glycol divinyl ether, polyethylene glycol divinyl ether, propylene glycol divinyl ether, tripropylene glycol divinyl ether, polypropylene glycol divinyl ether, butanediol divinyl ether, butylene glycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentavinyl ether, trimethylolpropane divinyl ether, trimethylolpropane trivinyl ether, glycerin divinyl ether, and glycerin trivinyl ether, where one kind of these alone or a mixture of two or more kinds may be used. In some aspects pentaerythritol triallyl ether may be used.

In the above-described multifunctional allyl-based compound or multifunctional vinyl-based compound, two or more unsaturated groups contained in the molecule are bonded to unsaturated bonds of water-soluble ethylene-based unsaturated monomers or an unsaturated bond of another internal crosslinking agent, whereby a crosslinking structure may be formed during the polymerization process. Therefore, unlike an acrylate-based compound that contains an ester bond (—(C═O)O—) in the molecule, the crosslinking may be maintained more stably even during a neutralization process after the polymerization reaction which will be described later.

As a result, the gel strength of the super absorbent polymer to be produced may be increased, process stability may be increased during a discharge process after polymerization, and the amount of water-soluble components may be minimized.

The crosslinking and polymerization of the water-soluble ethylene-based unsaturated monomer in the presence of such an internal crosslinking agent may be carried out in the presence of a polymerization initiator and as necessary, a thickener, a plasticizer, a storage stabilizer, an antioxidant, and the like.

In the monomer composition, this internal crosslinking agent may be used such that the amount thereof is approximately 0.01 to approximately 5 parts by weight with respect to 100 parts by weight of the water-soluble ethylene-based unsaturated monomer. For example, the internal crosslinking agent may be used such that the amount thereof is approximately 0.01 parts by weight or more, approximately 0.05 parts by weight or more, or approximately 0.1 parts by weight or more, and approximately 5 parts by weight or less, approximately 3 parts by weight or less, approximately 2 parts by weight or less, approximately 1 part by weight or less, or approximately 0.7 parts by weight or less with respect to 100 parts by weight of the water-soluble ethylene-based unsaturated monomer. In a case where the content of the internal crosslinking agent is too low, crosslinking may not occur sufficiently, which makes it difficult to achieve strength at an appropriate level or higher level, and in a case where the content of the internal crosslinking agent is too high, the internal crosslinking density may increase, which makes it difficult to achieve the desired water retention capacity. In particular, it is suitable for achieving the convexity and the solidity according to the present disclosure in a targeted range within the above range.

On the other hand, in a case where a small content of internal crosslinking agent is used to make a base resin have a high water retention capacity (CRC), the gel strength of the formed polymer may be lowered, and due to the low gel strength, it may be likely to be difficult to operate a chopping machine or the like during the chopping of the hydrous gel polymer. In this case, for the operation of a high-speed rotation type chopping machine or the like, the gel strength may be increased by using a mixture of two or more internal crosslinking agents, whereby the operation stability of the chopping machine or the like may be increased.

In the formed hydrous gel polymer, the shape of the particles may change depending on the degree of internal crosslinking, and a polymer formed by using such an internal crosslinking agent may have a three-dimensional network structure having a form in which the main chains formed by polymerizing the water-soluble ethylene-based unsaturated monomers are crosslinked by the internal crosslinking agent.

In such a case where the polymer has a three-dimensional network structure, the water retention capacity and absorbency under pressure, which are overall physical properties of the super absorbent polymer, may be markedly improved as compared with a case of a two-dimensional linear structure which does not undergo additional crosslinking by an internal crosslinking agent.

The polymer is such as one that is obtained by polymerizing a monomer and an internal crosslinking agent in the presence of a polymerization initiator, where the kind of polymerization initiator is not particularly limited. However, the polymerization may be carried out using a thermal polymerization method in a batch type reactor, and accordingly, a thermal polymerization initiator may be used as the polymerization initiator.

As the thermal polymerization initiator, one or more selected from the group of initiators consisting of a persulfate-based initiator, an azo-based initiator, hydrogen peroxide, and ascorbic acid may be used. Specifically, examples of the persulfate-based initiator include sodium persulfate ($Na_2S_2O_8$), potassium persulfate ($K_2S_2O_8$), and ammonium persulfate ($NH_4)_2S_2O_8$), and examples of the azo-based initiator include 2,2-azobis(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, and 4,4-azobis-(4-cyanovaleric acid). A more various thermal polymerization initiators are well described in a book written by Odian, 'Principle of Polymerization (Wiley, 1981)', p 203, and the thermal polymerization initiator is not limited to the above-described examples.

Such a polymerization initiator may be used such that the amount thereof is approximately 2 parts by weight or less with respect to 100 parts by weight of the water-soluble ethylene-based unsaturated monomer. That is, in a case where the concentration of the polymerization initiator is too low, the polymerization rate may be slow, and a large amount of residual monomer may be extracted in the final product, which is not desirable. Conversely, in a case where the concentration of the polymerization initiator is higher than the above range, the polymeric chains that make up a network are shortened. Therefore, the physical properties of the resin may decrease, that is, for example, the content of the water-soluble component increases, and absorbency under pressure decreases, which is not desirable.

On the other hand, in an aspect of the present disclosure, polymerization may be initiated by adding together, to the monomer composition, a reducing agent that makes up a redox couple with the above-described polymerization initiator.

Specifically, in a case where the initiator and reducing agent are added to the polymer solution, they react with each other to form a radical.

The formed radical reacts with the monomer, and since the oxidation-reduction reaction between the initiator and the reducing agent is very reactive, polymerization is initiated even in a case where only a trace amount of the initiator and reducing agent is added. As a result, it is not necessary to increase the process temperature, which makes it possible to carry out low-temperature polymerization and makes it possible to minimize changes in the physical properties of the polymer solution.

The polymerization reaction using the oxidation-reduction reaction may occur smoothly even at a temperature around or below ordinary temperature (25° C.). For example, the polymerization reaction may be carried out at a temperature of approximately 5° C. or higher and approximately 25° C. or lower, or approximately 5° C. or higher and approximately 20° C. or lower.

In an aspect of the present disclosure, in a case where a persulfate-based initiator is used as the initiator, the reducing agent to be used may be one or more selected from the group consisting of sodium metabisulfite ($Na_2S_2O_5$); tetramethylethylenediamine (TMEDA); a mixture of iron (II) sulfate and EDTA ($FeSO_4$/EDTA); sodium formaldehyde sulfoxylate; and disodium 2-hydroxy-2-sulfinoacteate.

For example, potassium persulfate may be used as an initiator, and disodium 2-hydroxy-2-sulfinoacteate may be used as a reducing agent; ammonium persulfate may be used as an initiator, and tetramethylethylenediamine may be used as a reducing agent; or sodium persulfate may be used as an initiator, and sodium formaldehyde sulfoxylate may be used as a reducing agent.

In another aspect of the present disclosure, in a case where a hydrogen peroxide-based initiator is used as the initiator, the reducing agent may be one or more selected from the group consisting of ascorbic acid; sucrose; sodium sulfite ($Na_2SO_3$); sodium metabisulfite ($Na_2S_2O_5$); tetramethylethylenediamine (TMEDA); a mixture of iron (II) sulfate and EDTA ($FeSO_4$/EDTA); sodium formaldehyde sulfoxylate; disodium 2-hydroxy-2-sulfinoacteate; and disodium 2-hydroxy-2-sulfoacteate.

The monomer composition may further contain, as necessary, additives such as a thickener, a plasticizer, a storage stabilizer, and an antioxidant.

In addition, the monomer composition containing the monomer may be in a solution state of being dissolved in a solvent, for example, water. In addition, the solid content in the monomer composition in such a solution state, that is, the concentrations of the monomer, the internal crosslinking agent, and the polymerization initiator, may be appropriately adjusted in consideration of polymerization time and reaction conditions. For example, the solid content in the monomer composition may be approximately 10% to approximately 80% by weight, approximately 15% to approximately 60% by weight, or approximately 30% to approximately 50% by weight.

The solvent that may be used in this case may be used without limitation in terms of the constitution thereof as long as it may dissolve the above-described components. For example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, N,N-dimethylacetamide, and the like may be used in combination.

A polymer obtained by such a method may form a polymer having a high molecular weight and having a uniform molecular weight distribution due to being polymerized using an ethylene-based unsaturated monomer in a non-neutralized state, and it is suitable for achieving the targeted convexity and solidity in an appropriate range since the content of the water-soluble component decreases.

In addition, the polymer may have a water content of approximately 30% to approximately 80% by weight. For example, the water content of the polymer may be approximately 80% by weight or less, approximately 70% by weight or less, or approximately 60% by weight or less while being approximately 30% by weight or more, approximately 45% by weight or more, or approximately 50% by weight or more.

In a case where the water content of the polymer is too low, it may be difficult to secure an appropriate surface area in the subsequent pulverization step, which makes pulverization ineffective. In a case where the water content of the polymer is too high, the pressure received in the subsequent pulverization step increases, which makes it difficult to carry out pulverization to a desired particle size.

On the other hand, throughout the present specification, "water content" is a content of moisture in the total weight of the polymer, where it means a value obtained by subtracting a weight of a polymer in a dry state from the weight of the polymer. Specifically, the water content is defined as a value calculated by measuring a weight loss due to the vaporization of moisture in the polymer during the process of drying a polymer in a crumb state, by raising the temperature thereof through infrared heating. In this case, the drying conditions are such that the temperature is increased from ordinary temperature to approximately 180° C. and then maintain the temperature at approximately 180° C. The total drying time is set to 40 minutes, including approximately 5 minutes for the temperature increase step, and then the water content is measured.

The super absorbent polymer according to an aspect of the present disclosure includes a base resin powder containing a crosslinked polymer of the above-described water-soluble ethylene-based unsaturated monomer having an acidic group and an internal crosslinking agent; and a surface crosslinked layer formed on the base resin powder, where the surface crosslinked layer is obtained by additionally crosslinking the crosslinked polymer via a surface crosslinking agent.

The surface crosslinked layer is formed on at least a part of the surface of the base resin powder, and it may be such one that is formed by additionally crosslinking the crosslinked polymer contained in the base resin powder via a surface crosslinking agent.

As the surface crosslinking agent, any surface crosslinking agent that has been conventionally used in the production of super absorbent polymers may be used without any restrictions. For example, the surface crosslinking agent includes ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol; one or more carbonate-based compounds selected from the group consisting of ethylene carbonate, propylene carbonate, and glycerol carbonate; an epoxy compound such as ethylene glycol diglycidyl ether; an oxazoline compound such as oxazolidinone; a polyamine compound; a mono-, di-, or polyoxazolidinone compound; a cyclic urea compound; or the like.

Specifically, one or more, two or more, or three or more of the surface crosslinking agents described above may be used as the surface crosslinking agent, where for example, ethylene carbonate-propylene carbonate (ECPC), propylene glycol and/or glycerol carbonate may be used.

Such a surface crosslinking agent may be used such that the amount thereof is approximately 0.001 to approximately 5 parts by weight with respect to 100 parts by weight of the particles of the super absorbent polymer. For example, the surface crosslinking agent may be used such that the content thereof is approximately 0.005 parts by weight or more, approximately 0.01 parts by weight or more, or approximately 0.05 parts by weight or less, and approximately 5 parts by weight or less, approximately 4 parts by weight or less, or approximately 3 parts by weight or less, with respect to 100 parts by weight of the particles of the super absorbent polymer. By adjusting the content range of the surface crosslinking agent to the above-described range, a super absorbent polymer exhibiting excellent overall physical properties for absorption may be produced. In particular, it is suitable for achieving the convexity and the solidity according to the present disclosure in a targeted range within the above range.

In addition, the surface crosslinked layer may be formed by adding an inorganic material to the surface crosslinking agent. That is, a surface crosslinked layer may be formed by additionally crosslinking the surface of the base resin powder in the presence of the surface crosslinking agent and the inorganic material.

As such an inorganic material, one or more inorganic materials selected from the group consisting of silica, clay, alumina, a silica-alumina composite, titania, a zinc oxide, and aluminum sulfate may be used. The inorganic material may be used in a powder form or a liquid form, and in particular, it may be used as an alumina powder, a silica-alumina powder, a titania powder, or a nano-silica solution. In addition, the inorganic material may be used such that the content thereof is approximately 0.001 to approximately 1 part by weight with respect to 100 parts by weight of the particles of the super absorbent polymer.

As described above, by adjusting, in a specific range, the convexity and the solidity, which are the parameters of the present disclosure, the super absorbent polymer including the base resin powder and the surface crosslinked layer formed on the base resin powder may absorb discharged bodily fluids at a high rate and in addition, allows a relatively large amount to be absorbed in the early stage, in a case of being applied to sanitary goods such as diapers, which makes it possible to prevent a problem that, for example, body fluids accumulate in the inside of the sanitary good or leak to the outside thereof.

II. Production Method for Super Absorbent Polymer

On the other hand, the super absorbent polymer in the related art is produced by crosslinking and polymerizing, in the presence of an internal crosslinking agent and a polymerization initiator, a water-soluble ethylene-based unsaturated monomer having acidic groups, at least some of which are neutralized, thereby forming a hydrous gel polymer, drying the hydrous gel polymer formed in this way, and then pulverizing the dried hydrous gel polymer to a desired particle size. In this case, in order to facilitate the drying of the hydrous gel polymer and in order to increase the efficiency of the pulverization process, a chopping process in which the hydrous gel polymer is cut into particles having a size of several millimeters is usually carried out before the drying process. However, due to the adhesiveness of the hydrous gel polymer in such a chopping process, the hydrous gel polymer may not be pulverized to a level of micro-sized particles and has a form of an aggregated gel. In a case where such an aggregated hydrous gel polymer having a form of an aggregated gel is dried, a plate-shaped dried body is formed. In order to pulverize the plate-shaped dried body to a level of micro-sized particles, a multi-step pulverization process needs to be carried out to lower the adhesiveness of the polymer, which resultantly causes a problem in that a lot of fine powder is generated in this process.

Specifically, super absorbent polymers in the related art have been produced including the following steps.

(Neutralization) a step of neutralizing at least some of acidic groups of the water-soluble ethylene-based unsaturated monomer;

(Polymerization) a step of crosslinking and polymerizing, in the presence of an internal crosslinking agent and a polymerization initiator, a water-soluble ethylene-based unsaturated monomer having acidic groups, at least some of which are neutralized, thereby forming a hydrous gel polymer;

(Chopping) a step of chopping the hydrous gel polymer;

(Drying) a step of drying the chopped hydrous gel polymer; and (Pulverization/classification) a step of pulverizing the dried polymer and then classifying it into normal particles and fine powder.

As described above, the chopped hydrous gel polymer has a form of an aggregated gel which has a size of approximately 1 cm to approximately 10 cm, and such a chopped hydrous gel polymer is laminated on a belt having a bottom made of a perforated plate and dried by hot air supplied from the bottom part or the upper part. Since the polymer dried by the above-described drying method has a plate shape rather than a particle shape, the step of carrying out classification after pulverization has been carried out to have steps of classification after rough pulverization, and again classification after pulverization so that the produced particles are normal particles, that is, so that the produced particles are particles having a particle diameter of approximately 150 m to approximately 850 m. Since the amount of the fine powder separated in the final classification step by such a production method is as large as approximately 20% to approximately 30% by weight with respect to the total weight of the final produced super absorbent polymer, the separated fine powder has been reused according to a method in which the separated fine powder is mixed with an appropriate amount of water to make it fine powder again, which is subsequently charged into the chopping step or the pre-drying step.

However, a case where the re-powdered fine powder mixed with water is charged again into the pulverization or drying process in order to reuse such fine powder causes problems such as causing an increase in device load and/or energy usage, and causes the deterioration of the physical properties of the super absorbent polymer due to the fine powder that remains without being classified.

As a result of repeated research to solve this problem, it was confirmed that instead of carrying out polymerization in a state where the acid group of the water-soluble ethylene-based unsaturated monomer is neutralized as in the case of the conventional production method for a super absorbent polymer, in a case where first, polymerization is carried out to form a polymer in a state where the acid group is not neutralized, and the hydrous gel polymer is micronized in the presence of a surfactant, and then the acid group of the polymer is neutralized, or in a case where the acidic group of the polymer in neutralized to form the hydrous gel polymer, and then the hydrous gel polymer is micronized in the presence of a surfactant, or the acidic group present in the polymer is subjected to neutralization and micronization at the same time, a large amount of surfactant is present on the surface of the polymer, and the high adhesiveness of the polymer is lowered to prevent the polymer from being excessively aggregating, and thus the super absorbent polymer may sufficiently serve to adjust the cohesion state to a desired level.

In this case, in a case where ultra-fine pulverization is carried out by applying high-strength mechanical shear force in the micronization step, it is possible to form aggregated hydrous gel particles having micropores.

The hydrous gel polymer produced by ultra-fine pulverization by applying high-strength mechanical shear force is produced in a form of particles having stable micropores of approximately 100 μm or less, which makes it possible to further reduce the amount of fine powder to be generated which is generated during the process since the pulverization and drying processes proceed under milder conditions.

In addition, through the ultra-fine pulverization process using the high-strength mechanical shear force, the absorption rate may also be improved by forming micropores in the hydrous gel polymer even without using a separate foaming agent in the polymerization step. As a result, it is easy to control, in a targeted range, the convexity and solidity of the above-described super absorbent polymer according to aspects according to the present disclosure.

On the other hand, the hydrous gel micronization process may be carried out in the presence of a surfactant. By using a surfactant in the micronization step, the aggregation of particles may be effectively controlled, and as a result, the load on the device is lowered, which makes it possible to further improve productivity.

In addition, in a case where polymerization is first carried out in a non-neutralized state to form a polymer, and then the acidic group present in the polymer is neutralized, it is possible to form a longer chain polymer, which makes it possible to achieve an effect of reducing the content of the water-soluble component that is present in an uncrosslinked state due to incomplete crosslinking.

The water-soluble component has the property of being easily eluted in a case where the super absorbent polymer comes in contact with a liquid. Therefore, in a case where the content of the water-soluble component is high, most of the eluted water-soluble component remains on the surface of the super absorbent polymer and makes the super absorbent polymer sticky, which causes the liquid permeability to decrease. As a result, in terms of liquid permeability, it is important to keep the content of the water-soluble component low.

It was confirmed that according to an aspect of the present disclosure, the content of the water-soluble component is lowered since the polymerization is carried out in a non-neutralized state, and thus the liquid permeability of the super absorbent polymer may be improved, which makes it easy to control convexity and solidity in a targeted range.

Hereinafter, the production method for the super absorbent polymer according to an aspect will be described in more detail according to each step.

Step 1: Polymerization Step

First, a monomer composition that contains a water-soluble ethylene-based unsaturated monomer having an acidic group, and an internal crosslinking agent, are subjected to polymerization to produce a base resin powder containing a polymer obtained by crosslinking and polymerizing the water-soluble ethylene-based unsaturated monomer having an acidic group and an internal crosslinking agent.

The step may be composed of a step of mixing the water-soluble ethylene-based unsaturated monomer having an acidic group, an internal crosslinking agent, and a polymerization initiator to prepare a monomer composition, and a step of subjecting the monomer composition to polymerization to form a polymer.

Here, to the contents of each component, all the contents described in the section I regarding the super absorbent polymer described above may be applied in the same way.

On the other hand, the water-soluble ethylene-based unsaturated monomer has an acidic group. As previously described, in the production of the super absorbent polymer in the related art, a monomer, in which at least some of the above-described acidic groups are neutralized by a neutralizing agent, is subjected to crosslinking and polymerization to form a polymer. Specifically, in the step of mixing the water-soluble ethylene-based unsaturated monomer having an acidic group, an internal crosslinking agent, a polymerization initiator, and a neutralizing agent, at least some of acidic groups of the water-soluble ethylene-based unsaturated monomer are neutralized.

However, according to an aspect of the present disclosure, polymerization is first carried out in a state where the acidic group of the water-soluble ethylene-based unsaturated monomer is not neutralized, and then a polymer is formed.

A water-soluble ethylene-based unsaturated monomer (for example, acrylic acid) in which the acidic group is in a state of being not neutralized is in a liquid state at ordinary temperature, has high miscibility with a solvent (water), and thus is present in a state of a mixed solution in the monomer composition. However, a water-soluble ethylene-based unsaturated monomer having a neutralized acidic group is in a solid state at ordinary temperature, has a different solubility depending on the temperature of the solvent (water), and has a lower solubility as the temperature is lower.

Such a water-soluble ethylene-based unsaturated monomer in which the acidic group is in a state of being not neutralized has a higher solubility or miscibility in the solvent (water) than the monomer having a neutralized acidic group and thus is not precipitated even at low temperature, and as a result, is advantageous for polymerization at low temperature for a long period of time. As a result, by carrying out polymerization for a long period of time using a water-soluble ethylene-based unsaturated monomer in which the acidic group is in a state of being not neutralized, it is possible to stably form a polymer having a higher molecular weight and a more uniform molecular weight distribution.

In addition, it is possible to form a longer chain polymer, which makes it possible to achieve an effect of reducing the content of the water-soluble component that is present in an uncrosslinked state due to incomplete polymerization or crosslinking. As a result, it is suitable for achieving, in a targeted range, the convexity and solidity of the above-described super absorbent polymer according to aspects according to the present disclosure.

In addition, in a case where first, polymerization is carried out to form a polymer in such a state where the acid group of the monomer is not neutralized, and after neutralization, micronization is carried out in the presence of a surfactant, or in a case where neutralization is carried out after micronization in the presence of a surfactant, or the acidic group present in the polymer is subjected to neutralization and micronization at the same time, a large amount of surfactant is present on the surface of the polymer, and the super absorbent polymer may sufficiently serve to lower the adhesiveness of the polymer.

According to an aspect of the present disclosure, the step of subjecting the monomer composition to polymerization to form a polymer may be carried out in a batch type reactor for 1 hour or more.

In general production methods for a super absorbent polymer, polymerization methods are largely divided into thermal polymerization and photopolymerization depending on the polymerization energy source. In general, in a case of carrying out thermal polymerization, it may be carried out in a reactor having a stirring axis such as a kneader, and in a case of carrying out photopolymerization, it may be carried out in a flat-bottomed container.

On the other hand, in a case where the polymerization is carried out as a continuous polymerization, for example, in a case where the polymerization is carried out in a reactor equipped with a conveyor belt, the polymerization is continuously carried out by supplying a new monomer composition to the reactor while moving a resultant product of the polymerization, and thus polymers having polymerization rates different from each other are mixed. As a result, it is difficult to achieve uniform polymerization throughout the monomer composition, which may lead to a decrease in overall physical properties.

However, according to an aspect of the present disclosure, since polymerization is carried out in a fixed-bed type manner in a batch type reactor, there is a small risk that polymers having polymerization rates different from each other are mixed, and as a result, a polymer having uniform quality may be obtained.

In addition, the polymerization step is carried out in a batch type reactor having a predetermined volume, and the polymerization reaction is carried out for a period longer than a period in a case where polymerization is carried out continuously in a reactor equipped with a conveyor belt, for example, for a period of approximately 1 hour or more, approximately 3 hours or more, or approximately 6 hours or more. Despite the polymerization reaction time of such a long period as described above, since a water-soluble ethylene-based unsaturated monomer in a non-neutralized state is subjected to polymerization, the monomer is less likely to be precipitated even in a case where the polymerization is carried out for a long period of time, and as a result, it is advantageous for long-term polymerization.

On the other hand, since the polymerization in the batch type reactor in the present disclosure uses a thermal polymerization method, a thermal polymerization initiator is used as the polymerization initiator, and the description regarding the corresponding components is as described above.

Steps 2 and 3: Micronization and Neutralization Steps

Next, a step of micronizing the hydrous gel polymer in the presence of a surfactant to produce a mixture containing the micronized hydrous gel polymer is provided (a step 2).

The micronization step is a step of micronizing the polymer in the presence of a surfactant, where it is a step in which micronization to a size of tens to hundreds of micrometers and aggregation are carried out at the same time rather than chopping the polymer to a size of millimeter order.

In other words, it is a step of producing secondary aggregated particles having a shape in which primary particles, which are micronized to a size of tens to hundreds of micrometers by imparting appropriate adhesiveness to the polymer, are aggregated. The particles of the hydrous super absorbent polymer, which are secondary aggregated particles produced in such a step, have a greatly increased surface area while having a normal particle size distribution, which may markedly improve the absorption rate.

On the other hand, in a case where ultra-fine pulverization is carried out at a rotation speed of approximately 500 rpm to approximately 4,000 rpm by applying high-strength mechanical shear force in the micronization step, aggregated hydrous gel particles having micropores may be formed.

In this case, since high-strength mechanical shear force is applied in a case where ultra-fine pulverization is carried out at a rotation speed of approximately 500 rpm to approximately 4,000 rpm, micropores of approximately 100 μm or less are easily formed in the polymer. However, as a result, the roughness of the surface increases, and the total surface area of the polymer is markedly increased due to the pores formed in the inside and outside of the polymer particles. Since the micropores are formed in a stable form as compared with pores that formed using a foaming agent in the polymerization step, the degree of generation of a fine powder due to the pores may be markedly reduced in the subsequent process. In the particles of the super absorbent polymer produced through such a step, the surface area is greatly increased, which may markedly improve the absorption rate. As a result, it is suitable for achieving, in a targeted range, the convexity and solidity of the above-described super absorbent polymer according to aspects according to the present disclosure.

The ultra-fine pulverization process is carried out at a rotation speed of approximately 500 rpm to approximately 4,000 rpm. However, In a case where the rotation speed of the process is less than approximately 500 rpm, it is difficult to form sufficient pores to a targeted level. Therefore, it is difficult to expect a high absorption rate, and it is difficult to secure productivity at a targeted level. In addition, in a case where the speed exceeds approximately 4,000 rpm, the polymer chain may be damaged due to excessive shear force, and as a result, the amount of the water-soluble component may increase, which may deteriorate the overall physical properties of the produced super absorbent polymer. The ultra-fine pulverization process may be carried out at approximately 1,000 rpm to approximately 3,500 rpm, or approximately 2,000 rpm to approximately 3,000 rpm. In this range, it is easy to form targeted micropores without the problems described above.

According to an aspect of the present disclosure, the micronization step is carried out with a micronization device, and the micronization device may include a body part that includes a transfer space having an inside to which a polymer is transferred; a screw member that is rotatably installed in the inside of the transfer space to move the polymer; a drive motor that provides a rotational driving force to the screw member; a cutter member that is installed on the body part to pulverize the polymer; and a perforated plate in which a plurality of holes are formed, where perforated plate discharges the polymer pulverized by the cutter member to the outside of the body portion.

In this case, the hole size provided in the perforated plate of the micronization device may be approximately 1 mm to approximately 25 mm, approximately 5 mm to approximately 20 mm, or approximately 5 mm to approximately 15 mm.

In such a case where a polymer mixed with the surfactant is micronized while controlling aggregation using a micronization device, a smaller particle size distribution is achieved, and thus the subsequent drying and pulverization process may be carried out under milder conditions. As a result, it is possible to improve the physical properties of the super absorbent polymer while preventing the generation of a fine powder, and in a case where ultra-fine pulverization is carried out, it is possible to improve the absorption rate through an increase in surface area by simultaneously forming appropriate micropores on the surface of the polymer.

The micronization step may be carried out one or more times and may be carried out 1 to 6 times, 1 to 4 times, or 1 to 3 times. This may be carried out using a plurality of micronization devices or may be carried out using a single micronization device including a plurality of perforated plates and/or a plurality of cutter members, where some of the plurality of micronization devices may include a plurality of perforated plates and/or a plurality of cutter members.

According to an aspect of the present disclosure, a surfactant may be additionally used in the micronization step. As a result, the aggregation between polymer particles is effectively controlled, and thus the load on the device to be used in the pulverization process is lowered, which makes it possible to further improve productivity.

In some aspects, a compound represented by Chemical Formula (2) or a salt thereof may be used as the surfactant; however, aspects of the present disclosure are not limited thereto:

[Chemical Formula 2]

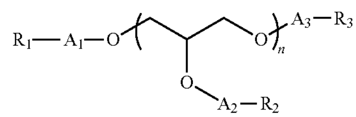

In Chemical Formula 2, $A_1$, $A_2$, and $A_3$ are each independently a single bond, carbonyl,

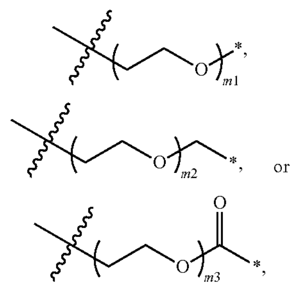

provided that one or more of these is carbonyl or

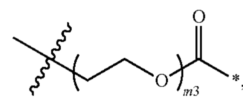

where m1, m2, and m3 are each independently an integer of 1 to 8, each

is connected to an adjacent oxygen atom, * is connected to adjacent $R_1$, $R_2$, and $R_3$, $R_1$, $R_2$, and $R_3$ are each independently hydrogen, a linear or branched alkyl having 6 to 18 carbon atoms, or a linear or branched alkenyl having 6 to 18 carbon atoms, and n is an integer of 1 to 9.

The surfactant is mixed with the polymer and then added so that the micronization step may be easily carried out without aggregation phenomenon.

The surfactant represented by Chemical Formula 2 is a nonionic surfactant and has excellent surface adsorption performance even with a non-neutralized polymer due to hydrogen bonding, and as a result, it is suitable for achieving a targeted aggregation control effect. On the other hand, in a case of an anionic surfactant which is not the nonionic surfactant, it is adsorbed via a $Na^+$ ion ionized by a carboxyl group substituent of the polymer in a case of being mixed with a polymer neutralized with a neutralizing agent such as NaOH or $Na_2SO_4$, and in a case of being mixed with a non-neutralized polymer, there is a problem that the adsorption efficiency to the polymer is relatively reduced due to competition with the anion of the carboxyl group substituent of the polymer.

Specifically, in the surfactant represented by Chemical Formula 2, the hydrophobic functional group is an $R_1$, $R_2$, or $R_3$ moiety (in a case of not being hydrogen) which is a terminal functional group, and the hydrophilic functional group further includes a glycerol-derived moiety in the chain and a terminal hydroxyl group (n=1 to 3 in a case where $A_1$ is a single bond and at the same time $R_n$ is hydrogen). However, the glycerol-derived moiety and the terminal hydroxyl group are hydrophilic functional groups and serve to improve adsorption performance on the polymer surface. As a result, the aggregation of particles of the super absorbent polymer may be effectively suppressed.

In Chemical Formula 2, the $R_1$, $R_2$, and $R_3$ moieties (in a case of not being hydrogen), which are a hydrophobic functional group, are each independently a linear or branched alkyl having 6 to 18 carbon atoms, or a linear or branched alkenyl having 6 to 18 carbon atoms. In this case, in a case where the $R_1$, $R_2$, and $R_3$ moieties (in a case of not being hydrogen) are alkyl or alkenyl having less than 6 carbon atoms, there is a problem that the aggregation control of the pulverized particles may not be effectively achieved due to the short chain length, and in a case where the $R_1$, $R_2$, and $R_3$ moieties (in a case of not being hydrogen) are alkyl or alkenyl having more than 18 carbon atoms, the mobility of the surfactant is reduced and thus may not be effectively mixed with the polymer, and there may be a problem that the unit cost of the composition increases due to an increase in the cost of the surfactant.

In some aspects, $R_1$, $R_2$, and $R_3$ may be hydrogen, in a case of being a linear or branched alkyl having 6 to 18 carbon atoms, they may be 2-methylhexyl, n-heptyl, 2-methylheptyl, n-octyl, n-nonyl, n-decanyl, n-undecanyl, n-dodecanyl, n-tridecanyl, n-tetradecanyl, n-pentadecanyl, n-hexadecanyl, n-heptadecanyl, or n-octadecanyl, or in a case of being a linear or branched alkenyl having 6 to 18 carbon atoms, they may be 2-hexenyl, 2-heptenyl, 2-octenyl, 2-nonenyl, n-dekenyl, 2-undekenyl, 2-dodekenyl, 2-tridekenyl, 2-tetradekenyl, 2-pentadekenyl, 2-hexadekenyl, 2-heptadekenyl, or 2-octadekenyl.

The surfactant may be selected from compounds represented by Chemical Formulae 2-1 to 2-14 below:

[Chemical Formula 2-1]

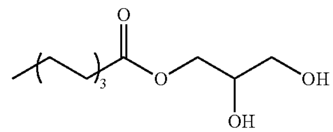

[Chemical Formula 2-2]

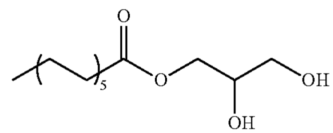

[Chemical Formula 2-3]

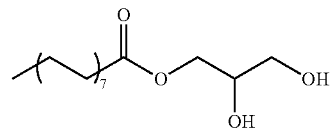

[Chemical Formula 2-4]

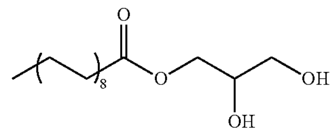

[Chemical Formula 2-5]

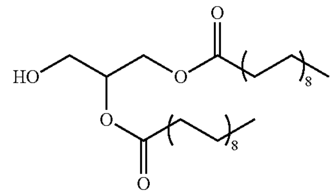

[Chemical Formula 2-6]

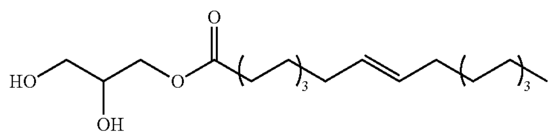

[Chemical Formula 2-7]

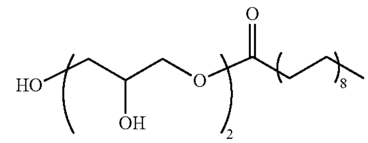

[Chemical Formula 2-8]

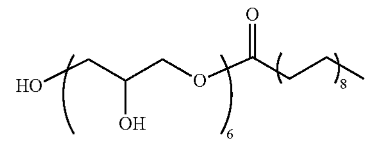

[Chemical Formula 2-9]

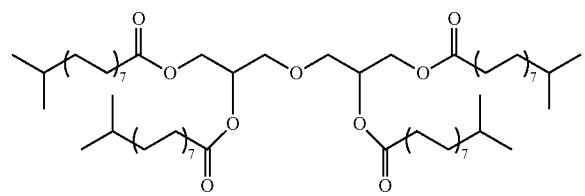

-continued

[Chemical Formula 2-10]

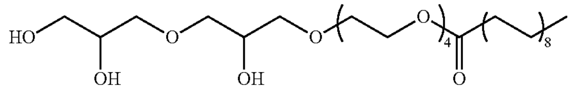

[Chemical Formula 2-11]

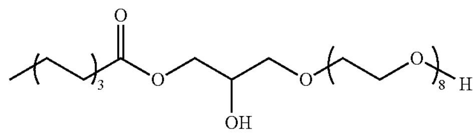

[Chemical Formula 2-12]

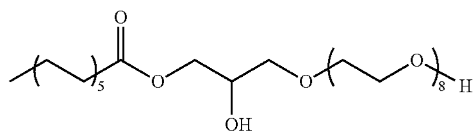

[Chemical Formula 2-13]

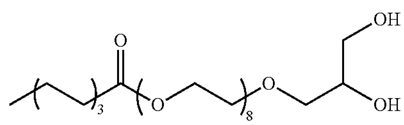

[Chemical Formula 2-14]

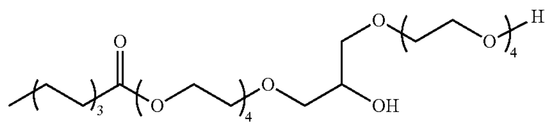

On the other hand, the amount of the surfactant to be used is not particularly limited; however, the amount of the surfactant to be used may be approximately 0.06 g to approximately 0.48 g per 1,000 g of the hydrous gel polymer depending on the securement of productivity or the equipment load state.

In a case where a too small amount of the surfactant is used, the surfactant is not uniformly adsorbed on the polymer surface, and thus the re-aggregation of particles after pulverization may occur, or water retention capacity and absorption performance such as absorbency under pressure may deteriorate due to sharing of a large amount of surfactant with the polymer. On the other hand, in a case where a too large amount of the surfactant is used, the overall physical properties of the finally produced super absorbent polymer may deteriorate due to a decrease in surface tension.

Therefore, for example, the surfactant may be used such that the amount thereof is approximately 0.48 g or less, approximately 0.45 g or less, or approximately 0.4 g or less while being approximately 0.06 g or more, approximately 0.1 g or more, or approximately 0.2 g or more per 1,000 g of the hydrous gel polymer, and as a result, it is easy to control, in a desired range, the convexity and solidity of the above-described super absorbent polymer according to aspects according to the present disclosure.

A method of mixing such a surfactant with a polymer is not particularly limited as long as it is a method that may mix these uniformly with the polymer, which may be appropriately adopted and used. Specifically, the surfactant may be mixed by a dry type method or mixed in a solution state after being dissolved in a solvent, or the surfactant may be melted and then mixed.

Among the above, for example, the surfactant may be mixed in a solution state of being dissolved in a solvent. In this case, any kind of solvent of an inorganic solvent or an organic solvent may be used without limitation; however, water is most appropriate considering the ease of the drying process and the cost of the solvent recovery system. In addition, for the solution, a method in which the surfactant and the polymer are placed in a reaction tank and then mixed, or the polymer is placed in a mixer and then the solution is sprayed, a method in which the polymer and the solution are continuously supplied to a continuously operating mixer and then mixed, or the like may be used.

On the other hand, in a case where the surfactant is mixed in a solution state of being dissolved in water, it may be used by being diluted into an aqueous solution having a concentration of approximately 0.01% to approximately 90%.

For example, in a case where the surfactant is to be used at approximately 0.1 g per 1,000 g of hydrous gel polymer, approximately 100 g of an aqueous solution having a concentration of approximately 0.1%, which is obtained by dissolving approximately 0.1 g of the surfactant in approximately 99.9 g of water, may be used. Alternatively, approximately 10 g of an aqueous solution having a concentration of approximately 1%, which is obtained by dissolving approximately 0.1 g of the surfactant in approximately 9.9 g of water, may be used.

That is, in a case where the same amount of surfactant is used, the surfactant may be used as an aqueous solution having a desired concentration by increasing or decreasing the water content, and the concentration may be appropriately adjusted in consideration of the physical properties of the super absorbent polymer to be finally produced.

According to an aspect of the present disclosure, a step (a step 3) of neutralizing at least some of the acidic groups of the polymer is carried out, where the micronization step of the step 2 described above and the neutralization step of the step 3 may be carried out sequentially, alternately, or simultaneously.

That is, first, the acidic groups are neutralized by adding a neutralizing agent to the polymer, and then a surfactant is added to the neutralized polymer to micronize the polymer mixed with the surfactant (carried out in the order of the step 3→the step 2), or a neutralizing agent and a neutralizing agent may be simultaneously added to the polymer to carry out the neutralization and micronization of the polymer (the step 2 and the step 3 are carried out simultaneously). Alternatively, a surfactant may be added first, and then a neutralizing agent may be added later (carried out in the order of the step 2→the step 3). Alternatively, a neutralizing agent and a surfactant may be added alternately. Alternatively, after a surfactant is added first and micronized, a neutralizing agent may be added to carry out neutralization, and then an additional surfactant may be further added to the neutralized hydrous gel polymer to further carry out the micronization process.

Here, in a case where the neutralization step is carried out independently from the micronization step of the step 2, it may be carried out in such a way that an additive is added simultaneously while pulverizing the polymer. More specifically, a screw-type extruder including a perforated plate having a plurality of holes may be used. The screw-type extruder is a device that carries out pulverization under mild conditions as compared with the micronization device used in the micronization step described above. The rotation speed may be about approximately 150 rpm to approximately 500 rpm, and the holes of the perforated plate are approximately 3 mm to approximately 25 mm; however, these are not limited thereto.

The rotation speed of the screw-type extruder and the size of the hole of the perforated plate affect the discharge state of the super absorbent polymer that is discharged from the extruder, and the particle shape of the super absorbent polymer may change depending on the discharge state.

In particular, by adjusting the rotation speed of the screw-type extruder to approximately 150 rpm to approximately 500 rpm, it is possible to control, in a desired range, the convexity and solidity of the above-described super absorbent polymer according to aspects according to the present disclosure.

In this case, a basic material such as sodium hydroxide, potassium hydroxide, or ammonium hydroxide, which may neutralize an acidic group, may be used as the neutralizing agent.

In addition, the degree of neutralization, which refers to the degree to which acidic groups contained in the polymer are neutralized by the neutralizing agent, may be approximately 50% to approximately 90% by mole, approximately 60% to approximately 85% by mole, approximately 65% to approximately 85% by mole, or approximately 65% to approximately 80% by mole. The range of the degree of neutralization may vary depending on the final physical properties, and the absorption rate and the absorption performance may be adjusted by adjusting the degree of neutralization.

In this case, in a case where the degree of neutralization is too high, the absorption capacity of the super absorbent polymer may decrease, and the concentration of carboxyl groups on the surface of the particle is too low. As a result, it is difficult to properly carry out surface crosslinking in the subsequent process, which may reduce the absorption characteristics under pressure or liquid permeability. Conversely, in a case where the degree of neutralization is too low, not only the absorption power of the polymer is greatly reduced, but properties such as those of elastic rubber which is difficult to handle may be exhibited.

On the other hand, for uniform neutralization of the entire polymer, it may be desirable to leave a certain time gap between the addition of the neutralizing agent and the micronization process.

Step 4: Drying Step

Next, a step (a step 4) of drying the micronized and neutralized polymer to produce a base resin powder is carried out.

The above step is a step in which at least some of the acidic groups of the polymer are neutralized and moisture in the base resin powder, which is a polymer obtained by micronizing the polymer, is dried.

In a general production method for a super absorbent polymer, in the drying step, drying is carried out so that the water content of the base resin powder is approximately 4% to approximately 20% by weight, approximately 4% to approximately 15% by weight, or approximately 6% to approximately 13% by weight. However, the present disclosure is not limited thereto.

The step 4 may be carried out by fixed-bed type drying, moving type drying, or a combination thereof.

According to an aspect of the present disclosure, the step 4 may be carried out by fixed-bed type drying.

The fixed-bed type drying refers to a method in which in a state where a material to be dried is stopped on a floor such as a perforated iron plate through which air may pass through, hot air passes through the material from bottom to top to dry it.

In the fixed-bed type drying, particles are dried in a plate shape without movement thereof, and thus it is difficult to achieve uniform drying with a simple flow of hot air. As a result, fixed-bed type drying requires delicate control of hot air and temperature to obtain a dried body having a uniform high water content. In the present disclosure, a change is made so that the hot air is upward instead of downward, which prevents the plate-shaped dried body from bending during drying and thus prevents hot air from leaking. In addition, the drying temperature was changed for each section and adjusted so that the top, the bottom, the left, and the right, and the upper layer, middle layer, and lower layers in the inside of the dried body, could be dried uniformly with a water content deviation of less than approximately 5%

As a device that is configured to be capable of carrying out drying by the fixed-bed type drying method, a belt type dryer or the like may be used; however, the device is not limited thereto.

In the case of the fixed-bed type drying step, the drying process may be carried out at a temperature of approximately 80° C. to approximately 200° C., where the temperature may be 90° C. to 190° C. or 100° C. to 180° C. In a case where the drying temperature is less than approximately 80° C., the drying time may be excessively long, and in a case where the drying temperature is more than approximately 200° C. and thus excessively high, a super absorbent polymer having a water content lower than the targeted water content may be obtained. On the other hand, the drying temperature may mean the temperature of the hot air to be used or may mean the internal temperature of the device during the drying process.

According to an aspect of the present disclosure, the step 4 may be carried out by moving type drying.

The moving type drying refers to a method of drying a dried body while mechanically stirring it during drying. In this case, the direction in which hot air passes through a material may be the same as or different from the direction of circulation of the material. Alternatively, a material may be dried by circulating the material in the inside of the dryer and allowing a heat mediating fluid (heat transfer fluid) to pass through a separate pipe outside the dryer.

As a device that is configured to be capable of carrying out drying by such a moving type drying method, a horizontal-type mixer, a rotary kiln, a paddle dryer, a steam tube dryer, a commonly used moving type dryer, or the like may be used.

In the case of the moving type drying step, the drying process may be carried out at a temperature of approximately 100° C. to approximately 300° C., where the temperature may be 120° C. to 280° C. or 150° C. to 250° C. In a case where the drying temperature is less than approximately 100° C. and thus too low, the drying time may be excessively long. In a case where the drying temperature is more than approximately 300° C. and thus excessively high, the polymer chain of the super absorbent polymer may be damaged and thus the overall physical properties may deteriorate, and in addition, a super absorbent polymer having a water content lower than a desired water content may be obtained.

Step 5: Pulverization Step

Next, a step of pulverizing the dried base resin powder is carried out.

Specifically, the pulverization step may be carried out so that the dry base resin powder is pulverized to have a particle size at a level of the particle size of the normal particle level, that is, a particle diameter of approximately 150 μm to approximately 850 μm.

The pulverizer to be used for this purpose may be specifically, a vertical pulverizer, a turbo cutter, a turbo grinder, a rotary cutter mill, a cutter mill, a disc mill, a shred pulverizer, a crusher, a chopper, a disc cutter, or the like; however, the pulverizer is not limited to the examples described above.

Alternatively, a pin mill, a hammer mill, a screw mill, a roll mill, a disc mill, a jog mill, or the like may be used as the pulverizer; however, the pulverizer is not limited to the examples described above.

On the other hand, in the production method according to the present disclosure, in the micronization step, it is possible to obtain particles of the super absorbent polymer having a small particle size distribution as compared with that in the conventional chopping step. In addition, even in a case where pulverization is carried out under mild conditions with smaller pulverization force, it is possible to form a super absorbent polymer having a very high content and having a normal particle size of approximately 150 μm to approximately 850 μm, and it is possible to greatly reduce the generation rate of the fine powder since the water content after drying is maintained relatively high.

The particles of the super absorbent polymer produced as above may include particles of the super absorbent polymer having a particle diameter of approximately 150 μm to approximately 850 μm, that is, normal particles such that the amount thereof is, with respect to the total weight, approximately 80% by weight or more, approximately 85% by weight, approximately 89% by weight or more, approximately 90% by weight or more, approximately 92% by weight or more, approximately 93% by weight, approximately 94% by weight or more, or approximately 95% by weight or more. The particle diameter of such resin particles may be measured according to the European Disposables and Nonwovens Association (EDANA) standard EDANA WSP 220.3 method.

In addition, the particles of the super absorbent polymer may include a fine powder having a particle diameter of less than approximately 150 μm such that the amount thereof is, with respect to the total weight, approximately 20% by weight or less, approximately 18% by weight or less, approximately 15% by weight or less, approximately 13% by weight or less, approximately 12% by weight or less, approximately 11% by weight or less, approximately 10% by weight or less, approximately 9% by weight or less, approximately 8% by weight or less, or approximately 5% by weight or less. This is in contrast to having a fine powder of more than approximately 20% by weight to approximately 30% by weight in a case where the super absorbent polymer is produced according to a production method in the related art.

Additive Addition Step

On the other hand, according to an aspect of the present disclosure, a step of adding an additive to the micronized and neutralized polymer may be further provided before the drying step (the step 4).

The additive addition process is a process for improving physical properties by using an additional additive within a range that does not impair the targeted effect. The kind of the additive is not particularly limited, and examples thereof include, but not limited to, a polymerization initiator for removing residual monomers, a liquid permeability improver for improving absorption properties, a fine powder anti-caking agent for recycling a generated fine powder, a fluidity improver, an antioxidant, a neutralizing agent, and a surfactant.

The additive addition step may be carried out simultaneously with the step 2, simultaneously with the step 3, after the step 2 and the step 3, or in at least one or more steps in these steps. The additive addition step may be carried out a plurality of times as necessary and may be carried out more than once in each step.

This may be carried out in such a way that the additive is added while the polymer is pulverized in a case where the additive addition step is carried out independently from the step 2 and the step 3, that is, in a case where it is carried out after the step 2 and the step 3 and before the step 4.

To the pulverization, typically, the pulverization step of the step 5 described above may be applied in the same way, and in the pulverization step, the additive may be added once or a plurality of times and mixed with the polymer.

Classification Step

Next, a step of classifying the pulverized particles of the super absorbent polymer according to the particle diameter may be further provided after the step (the step 5) of pulverizing the base resin powder.

Surface Crosslinking Step

In addition, a step of forming a surface crosslinked layer on at least a part of the surface of the base resin particles in the presence of a surface crosslinking agent may be further provided after pulverizing (the step 5) and/or classifying the base resin powder. Through the above step, the crosslinked polymer contained in the base resin powder is additionally crosslinked via a surface crosslinking agent, and thus a surface crosslinked layer may be formed on at least a part of the surface of the base resin powder.

In the description regarding the surface crosslinking agent, all of the above-described contents may be applied in the same way.

In addition, the configuration of the method of mixing the surface crosslinking agent with the base resin powder is not limited. It is possible to use, for example, a method of placing a surface crosslinking agent and a composition containing a base resin powder in a reaction tank and mixing them or spraying a surface crosslinking agent to the composition, or a step of continuously supplying a resin composition and a surface crosslinking agent to a continuously operated mixer and then mixing them.

In a case where the surface crosslinking agent and the base resin powder are mixed, water and methanol may be mixed together and then additionally added. In a case where water and methanol are added, there is an advantage that the surface crosslinking agent may be uniformly dispersed in the resin composition. In this case, the content of water and methanol to be added may be appropriately adjusted to induce uniform dispersion of the surface crosslinking agent and to prevent the aggregation of the resin composition and at the same time optimize the surface penetration depth of the crosslinking agent.

The surface crosslinking process may be carried out at a temperature of approximately 80° C. to approximately 250° C. More specifically, the surface crosslinking process may be carried out at a temperature of approximately 100° C. to approximately 220° C., or approximately 120° C. to approximately 200° C., for approximately 20 minutes to approximately 2 hours, or approximately 40 minutes to approximately 80 minutes. In a case where the above-described surface crosslinking process conditions are satisfied, the surface of the particle of the super absorbent polymer may be sufficiently crosslinked to increase the absorbency under pressure.

The temperature raising means for the surface crosslinking reaction is not particularly limited.

Heating may be done by supplying a heat transfer medium or directly supplying a heat source. In this case, regarding the kind of heat transfer medium that may be used, a fluid of which the temperature is raised, such as steam, hot air, or hot oil, may be used; however, the heat transfer medium is not limited thereto. In addition, the temperature of the heat transfer medium to be supplied may be appropriately selected in consideration of the means of the heat transfer medium, the temperature rise rate, and the target temperature rise rate. On the other hand, examples of the directly supplied heat source include heating through electricity and heating through gas; however, the directly supplied heat source is not limited to the examples described above.

Post-Treatment Step

According to an aspect of the present disclosure, any one or more steps among a cooling step of cooling particles of the super absorbent polymer on which the surface crosslinked layer has been formed, a water addition step of adding water to the particles of the super absorbent polymer on which the surface crosslinked layer has been formed, and a post-treatment step of adding an additive to the particles of the super absorbent polymer on which the surface crosslinked layer has been formed may be provided and then carried out after the step of forming the surface crosslinked layer on at least a part of the surface of the base resin powder. In this case, the cooling step, water addition step, and post-treatment step may be carried out sequentially or simultaneously.

Water or salt water may be used in the water addition step, through which the amount of riddlings, and the like, may be controlled. The amount of water to be used may be appropriately adjusted in consideration of the water content of the targeted final product, and the water may be used such that the amount thereof is approximately 0.1% to approximately 10% by weight, approximately 0.5% to approximately 8% by weight, or approximately 1% to approximately 5% by weight with respect to the absorbent resin; the amount thereof is not limited thereto.

In addition, a maturation step may be further carried out after the water addition step.

In a case where salt water is used in the water addition step, the solution absorption rate is relatively low due to the conductivity of the salt water, and thus the salt water spreads uniformly in the maturation step, which enables uniform absorption of the absorbent resin. In the maturation step, a commonly used method may be applied without particular limitation, and it may be carried out, for example, by using a rotary stirring facility, at approximately 100° C. or lower, approximately 80° C. or lower, or 50° C. or lower for approximately 10 minutes to approximately 1 hour.

The additive to be added in the post-treatment step may be a surfactant, inorganic salts, a liquid permeability improver, an anti-caking agent, a fluidity improver, an antioxidant, or the like; however, the present disclosure is not limited thereto.

By selectively carrying out the cooling step, the water addition step, and the post-treatment step, it is possible to control the generation of riddlings, thereby improving the water content of the final super absorbent polymer, and it is possible to produce a super absorbent polymer product having higher quality.

Hereinafter, the action and effect of aspects of the disclosure will be described in more detail through specific examples. However, these examples are merely presented as examples of the aspects of the disclosure, and thus the scope of the disclosure is not determined by them.

EXAMPLES

Example 1

(Step 1: Polymer Producing Step)

In a 5 L glass container equipped with a stirrer and thermometer, 1,500 g of acrylic acid, 3.75 g of pentaerythritol triallyl ether (PETTAE) as an internal crosslinking agent, and 3,401 g of water were stirred and mixed and then allowed to react while maintained at approximately 5° C. Nitrogen was introduced at approximately 1,000 cc/min into the glass container containing the above mixture for approximately 1 hour to allow the glass container to be replaced with nitrogen conditions. Next, 30.0 g of a 0.3% aqueous hydrogen peroxide solution, 15.0 g of a 1% aqueous ascorbic acid solution, and 45.0 g of a 2% aqueous solution of 2,2'-azobis-(2-amidinopropane)dihydrochloric acid were added thereto as polymerization initiators, and at the same time, 22.5 g of a 0.01% aqueous solution of iron sulfate was added thereto as a reducing agent, whereby polymerization was initiated. After the temperature of the mixture reached approximately 85° C., polymerization was carried out at approximately 90° C.±2° C. for approximately 6 hours to obtain a polymer.

(Steps 2 and 3: Micronization and Neutralization Steps)

100 g of a 0.45 wt % aqueous solution of glycerol monolaurate (GML) was added to 5,000 g of the polymer obtained in the step 1. Thereafter, using a high-speed rotation type chopping machine (F-150/Karl Schnell) mounted in the inside of a cylindrical pulverizer, the resultant mixture was extruded at a rotation speed of approximately 2,000 rpm onto a perforated plate having a plurality of holes of approximately 10 mm, whereby the micronization process was carried out.

Thereafter, using a screw-type extruder mounted in the inside of a cylindrical pulverizer, the recovered hydrous gel polymer was extruded three times at a rotation speed of approximately 250 rpm onto a perforated plate having a plurality of holes of approximately 10 mm, whereby an additional pulverization process was carried out. According to each step for the screw-type extruder, 1,383 g of a 50% NaOH aqueous solution (the step 3: neutralization step) was added to neutralize some of the acidic groups of the polymer, and then each of 100 g of the fine powder (the additional additive addition step) and 157 g of a 10% $Na_2SO_4$ aqueous solution (the additional additive addition step) was added to produce particles of the hydrous super absorbent polymer (=micronized and neutralized polymer).

(Step 4: Drying Step)

1,000 g of the particles of the hydrous super absorbent polymer were charged into a dryer including a perforated plate configured to be capable of carrying out the transition of air flow upward or downward. To make the water content of the dried super absorbent polymer approximately 10%, hot air at approximately 200° C. and hot air at approximately 100° C. were allowed to sequentially flow from top to bottom for approximately 5 minutes and approximately 10 minutes, respectively, and then hot air at approximately 100° C. was again allowed to flow from bottom to top for approximately 15 minutes to dry the polymer uniformly.

(Step 5: Pulverization and Classification Steps)

The dried body was pulverized using a pulverizer (GRAN-U-LIZER™ MPE) and then classified using a standard sieve according to the ASTM standard to obtain a base resin powder having a size of approximately 150 to approximately 850 m.

(Surface Crosslinking Step)

Next, an aqueous surface crosslinking agent solution containing, per 100 g of the base resin powder, 4 g of water, 6 g of methanol, and 0.05 g of ethylene glycol diglycidyl ether (EJ-1030S), as well as 0.1 g of propylene glycol and 0.2 g of aluminum sulfate, was sprayed and stirred at ordinary temperature to carry out mixing so that the surface crosslinking solution was uniformly distributed on the super absorbent polymer powder. Subsequently, the base resin powder mixed with the surface crosslinking solution was placed in a surface crosslinking reactor to allow a surface crosslinking reaction to proceed. In this surface crosslinking reactor, the surface crosslinking reaction of the base resin powder was allowed to proceed at approximately 140° C. for approximately 40 minutes to obtain a super absorbent polymer that had undergone surface crosslinking.

After the surface crosslinking step, the super absorbent polymer that had undergone surface crosslinking was classified using a standard sieve according to the ASTM standard to produce a super absorbent polymer (water content: 1.8%) having a particle diameter of approximately 150 m to approximately 850 m.

Example 2

(Step 1: Polymer Producing Step)

A polymer was obtained in the same manner as in Example 1 above, except that instead of 3.75 g of pentaerythritol triallyl ether (PETTAE), 3.0 g of pentaerythritol triallyl ether (PETTAE) and 0.75 g of trimethylolpropane triacrylate (TMPTA) (Miramer M3190, a product from Miwon Specialty Chemical Co., Ltd.) were used as internal crosslinking agents.

(Steps 2 and 3: Micronization and Neutralization Steps)

Particles of the hydrous super absorbent polymer (=micronized and neutralized polymer) were produced in the same method as in Example 1, except that the rotation speed of the high-speed rotary chopping machine was set to approximately 2,500 rpm.

Thereafter, the steps of drying, pulverization, classification, and surface crosslinking were carried out in the same methods as in Example 1, whereby a super absorbent polymer (water content: 1.6%) was produced.

Example 3

(Post-Treatment Step)

The super absorbent polymer produced in Example 2 was additionally subjected to a water addition step of adding water as follows.

An aqueous solution containing 4 g of water and about 0.4 g of a polycarboxylic acid-based copolymer per 100 g of the super absorbent polymer produced in Example 2 was sprayed and stirred to carry out mixing so that the solution was uniformly distributed on the super absorbent polymer powder. Subsequently, mixing was carried out uniformly for approximately 20 minutes in a reactor at approximately 50° C., whereby a super absorbent polymer (water content: 4.6%) was produced.

Example 4

(Step 1: Polymer Producing Step)

A polymer was obtained in the same manner as in Example 1 above, (Steps 2 and 3: Micronization and Neutralization Steps)

299 g of a 0.45 wt % aqueous solution of glycerol monolaurate (GML) was added to 5,000 g of the polymer obtained in the step 1. Thereafter, using a high-speed rotation type chopping machine (F-150/Karl Schnell) mounted in the inside of a cylindrical pulverizer, the resultant mixture was extruded at a rotation speed of approximately 2,000 rpm onto a perforated plate having a plurality of holes of approximately 10 mm, whereby the micronization process was carried out.

Thereafter, using a screw-type extruder mounted in the inside of a cylindrical pulverizer, the recovered hydrous gel polymer was extruded three times at a rotation speed of approximately 150 rpm onto a perforated plate having a plurality of holes of approximately 10 mm, whereby an additional pulverization process was carried out. According to each step for the screw-type extruder, 1,383 g of a 50% NaOH aqueous solution (the step 3: neutralization step) was added to neutralize some of the acidic groups of the polymer, and then each of 100 g of the fine powder (the additional additive addition step) and 157 g of a 10% $Na_2SO_4$ aqueous solution (the additional additive addition step) was added to produce particles of the hydrous super absorbent polymer (=micronized and neutralized polymer).

Thereafter, the steps of drying, pulverization, classification, and surface crosslinking were carried out in the same methods as in Example 1, whereby a super absorbent polymer (water content: 1.9%) was produced.

Example 5

(Step 1: Polymer Producing Step)

In a 5 L glass container equipped with a stirrer and thermometer, 1,500 g of acrylic acid, 3.75 g of pentaerythritol triallyl ether (PETTAE) as an internal crosslinking agent, and 3,401 g of water were stirred and mixed and then allowed to react while maintained at approximately 5° C. Nitrogen was introduced at approximately 1,000 cc/min into the glass container containing the above mixture for approximately 1 hour to allow the glass container to be replaced with nitrogen conditions. Next, 30.0 g of a 0.3% aqueous hydrogen peroxide solution, 15.0 g of a 1% aqueous ascorbic acid solution, and 45.0 g of a 2% aqueous solution of 2,2'-azobis-(2-amidinopropane)dihydrochloric acid were added thereto as polymerization initiators, and at the same time, 22.5 g of a 0.01% aqueous solution of iron sulfate was added thereto as a reducing agent, whereby polymerization was initiated. After the temperature of the mixture reached approximately 85° C., polymerization was carried out at approximately 85° C.±2° C. for approximately 8 hours to obtain a polymer.

(Steps 2 and 3: Micronization and Neutralization Steps)

100 g of a 0.45 wt % aqueous solution of glycerol monolaurate (GML) was added to 5,000 g of the polymer obtained in the step 1. Thereafter, using a high-speed rotation type chopping machine (F-150/Karl Schnell) mounted in the inside of a cylindrical pulverizer, the resultant mixture was extruded at a rotation speed of approximately 1,500 rpm onto a perforated plate having a plurality of holes of approximately 15 mm, whereby the micronization process was carried out.

Thereafter, using a screw-type extruder mounted in the inside of a cylindrical pulverizer, the recovered hydrous gel polymer was extruded three times at a rotation speed of approximately 500 rpm onto a perforated plate having a plurality of holes of approximately 6 mm, whereby an additional pulverization process was carried out. According to each step for the screw-type extruder, 1,383 g of a 50% NaOH aqueous solution (the step 3: neutralization step) was added to neutralize some of the acidic groups of the polymer, and then each of 100 g of the fine powder (the additional additive addition step) and 157 g of a 10% $Na_2SO_4$ aqueous solution (the additional additive addition step) was added to produce particles of the hydrous super absorbent polymer (=micronized and neutralized polymer).

Thereafter, the steps of drying, pulverization, classification, and surface crosslinking were carried out in the same methods as in Example 1, whereby a super absorbent polymer (water content: 1.7%) was produced.

Example 6

(Step 1: Polymer Producing Step)

A polymer was obtained in the same manner as in Example 1 above, except that instead of 3.75 g of pentaerythritol triallyl ether (PETTAE), 3.0 g of pentaerythritol triallyl ether (PETTAE) and 0.75 g of trimethylolpropane triacrylate (TMPTA) (Miramer M3190, a product from Miwon Specialty Chemical Co., Ltd.) were used as internal crosslinking agents.

(Steps 2 and 3: Micronization and Neutralization Steps)

150 g of a 0.45 wt % aqueous solution of glycerol monolaurate (GML) was added to 5,000 g of the polymer obtained in the step 1. Thereafter, using a high-speed rotation type chopping machine (F-150/Karl Schnell) mounted in the inside of a cylindrical pulverizer, the resultant mixture was extruded at a rotation speed of approximately 3,000 rpm onto a perforated plate having a plurality of holes of approximately 10 mm, whereby the micronization process was carried out.

Thereafter, using a screw-type extruder mounted in the inside of a cylindrical pulverizer, the recovered hydrous gel polymer was extruded three times at a rotation speed of approximately 250 rpm onto a perforated plate having a plurality of holes of approximately 10 mm, whereby an additional pulverization process was carried out. According to each step for the screw-type extruder, 1,383 g of a 50% NaOH aqueous solution (the step 3: neutralization step) was added to neutralize some of the acidic groups of the polymer, and then each of 100 g of the fine powder (the additional additive addition step) and 157 g of a 10% $Na_2SO_4$ aqueous solution (the additional additive addition step) was added to produce particles of the hydrous super absorbent polymer (=micronized and neutralized polymer).

Thereafter, the steps of drying, pulverization, classification, and surface crosslinking were carried out in the same methods as in Example 1, whereby a super absorbent polymer (water content: 1.8%) was produced.

Comparative Example 1

(Step 1: Polymer Producing Step)

In a 5 L glass container equipped with a stirrer and thermometer, 1,500 g of acrylic acid, 5.25 g of pentaerythritol triallyl ether (PETTAE) as an internal crosslinking agent, and 3,404 g of water were stirred and mixed and then allowed to react while maintained at approximately 5° C. Nitrogen was introduced at approximately 1,000 cc/min into the glass container containing the above mixture for approximately 1 hour to allow the glass container to be replaced with nitrogen conditions. Next, 30.0 g of a 0.3% aqueous hydrogen peroxide solution, 15.0 g of a 1% aqueous ascorbic acid solution, and 45.0 g of a 2% aqueous solution of 2,2'-azobis-(2-amidinopropane)dihydrochloric acid were added thereto as polymerization initiators, and at the same time, 22.5 g of a 0.01% aqueous solution of iron sulfate was added thereto as a reducing agent, whereby polymerization was initiated. After the temperature of the mixture reached approximately 85° C., polymerization was carried out at approximately 90° C.±2° C. for about 6 hours to obtain a polymer.

(Steps 2 and 3: Micronization and Neutralization Steps)

Using a high-speed rotation type chopping machine (F-150/Karl Schnell) mounted in the inside of a cylindrical pulverizer, 5,000 g of the polymer obtained in the step 1 was extruded at a rotation speed of approximately 2,000 rpm onto a perforated plate having a plurality of holes of approximately 10 mm, whereby the micronization process was carried out.

Thereafter, using a screw-type extruder mounted in the inside of a cylindrical pulverizer, the recovered hydrous gel polymer was extruded three times at a rotation speed of approximately 250 rpm onto a perforated plate having a plurality of holes of approximately 10 mm, whereby an additional pulverization process was carried out. According to each step for the screw-type extruder, 1,161 g of a 50% NaOH aqueous solution (the step 3: neutralization step) was added to neutralize some of the acidic groups of the polymer, and then each of 100 g of the fine powder (the additional additive addition step) and 165 g of a 10% $Na_2SO_4$ aqueous solution (the additional additive addition step) was added to produce particles of the hydrous super absorbent polymer (=micronized and neutralized polymer).

(Step 4: Drying Step)

1,000 g of the particles of the hydrous super absorbent polymer were charged into a dryer including a perforated plate configured to be capable of carrying out the transition of air flow upward or downward. To make the water content of the dried super absorbent polymer approximately 10%, hot air at approximately 200° C. and hot air at approximately 100° C. were allowed to sequentially flow from top to bottom for approximately 5 minutes and approximately 10 minutes, respectively, and then hot air at approximately 100° C. was again allowed to flow from bottom to top for approximately 15 minutes to dry the polymer uniformly.

(Step 5: Pulverization and Classification Steps)

The dried body was pulverized using a pulverizer (GRAN-U-LIZER™ MPE) and then classified using a standard sieve according to the ASTM standard to obtain a base resin powder having a size of approximately 150 to approximately 850 m.

(Surface Crosslinking Step)

Next, an aqueous surface crosslinking agent solution containing, per 100 g of the base resin powder, 5.5 g of water, 6 g of methanol, and 0.15 g of ethylene glycol diglycidyl ether (EJ-1030S), as well as 0.3 g of aluminum sulfate, was sprayed and stirred at ordinary temperature to carry out mixing so that the surface crosslinking solution was uniformly distributed on the super absorbent polymer powder. Subsequently, the base resin powder mixed with the surface crosslinking solution was placed in a surface crosslinking reactor to allow a surface crosslinking reaction to proceed. In this surface crosslinking reactor, the surface crosslinking reaction of the base resin powder was allowed to proceed at about approximately 140° C. for approximately 40 minutes to obtain a super absorbent polymer that had undergone surface crosslinking.

After the surface crosslinking step, the super absorbent polymer that had undergone surface crosslinking was classified using a standard sieve according to the ASTM standard to produce a super absorbent polymer having a particle diameter of approximately 150 m to approximately 850 m.

Comparative Example 2

(Step 1: Polymer Producing Step)

In a 5 L glass container equipped with a stirrer and thermometer, 1,500 g of acrylic acid, 5.25 g of pentaerythritol triallyl ether (PETTAE) as an internal crosslinking agent, and 3,404 g of water were stirred and mixed and then allowed to react while maintained at approximately 5° C. Nitrogen was introduced at approximately 1,000 cc/min into the glass container containing the above mixture for 1 hour to allow the glass container to be replaced with nitrogen conditions. Next, 30.0 g of a 0.3% aqueous hydrogen peroxide solution, 15.0 g of a 1% aqueous ascorbic acid solution, and 45.0 g of a 2% aqueous solution of 2,2'-azobis-(2-amidinopropane)dihydrochloric acid were added thereto as polymerization initiators, and at the same time, 22.5 g of a 0.01% aqueous solution of iron sulfate was added thereto as a reducing agent, whereby polymerization was initiated. After the temperature of the mixture reached approximately 85° C., polymerization was carried out at approximately 90° C.±2° C. for about 6 hours to obtain a polymer.

(Steps 2 and 3: Micronization and Neutralization Steps)

597 g of a 0.45 wt % aqueous solution of glycerol monolaurate (GML) was added to 5,000 g of the polymer obtained in the step 1. Thereafter, using a high-speed rotation type chopping machine (F-150/Karl Schnell) mounted in the inside of a cylindrical pulverizer, the resultant mixture was extruded at a rotation speed of approximately 2,000 rpm onto a perforated plate having a plurality of holes of approximately 10 mm, whereby the micronization process was carried out.

Thereafter, using a screw-type extruder mounted in the inside of a cylindrical pulverizer, the recovered hydrous gel polymer was extruded three times at a rotation speed of approximately 250 rpm onto a perforated plate having a plurality of holes of approximately 10 mm, whereby an additional pulverization process was carried out. According to each step for the screw-type extruder, 1,037 g of a 50% NaOH aqueous solution (the step 3: neutralization step) was added to neutralize some of the acidic groups of the polymer, and then each of 100 g of the fine powder (the additional additive addition step) and 150 g of a 10% $Na_2SO_4$ aqueous solution (the additional additive addition step) was added to produce particles of the hydrous super absorbent polymer (=micronized and neutralized polymer).

(Step 4: Drying Step)

1,000 g of the particles of the hydrous super absorbent polymer were charged into a dryer including a perforated plate configured to be capable of carrying out the transition of air flow upward or downward. To make the water content of the dried super absorbent polymer approximately 10%, hot air at approximately 200° C. and hot air at approximately 100° C. were allowed to sequentially flow from top to bottom for approximately 5 minutes and approximately 10 minutes, respectively, and then hot air at approximately 100° C. was again allowed to flow from bottom to top for approximately 15 minutes to dry the polymer uniformly.

(Step 5: Pulverization and Classification Steps)

The dried body was pulverized using a pulverizer (GRAN-U-LIZER™ MPE) and then classified using a standard sieve according to the ASTM standard to obtain a base resin powder having a size of approximately 150 to approximately 850 μm.

(Surface Crosslinking Step)

Next, an aqueous surface crosslinking agent solution containing, per 100 g of the base resin powder, 5.5 g of water, 5 g of methanol, and 0.07 g of ethylene glycol diglycidyl ether (EJ-1030S), was sprayed and stirred at ordinary temperature to carry out mixing so that the surface crosslinking solution was uniformly distributed on the super absorbent polymer powder. Subsequently, the base resin powder mixed with the surface crosslinking solution was placed in a surface crosslinking reactor to allow a surface crosslinking reaction to proceed. In this surface crosslinking reactor, the surface crosslinking reaction of the base resin powder was allowed to proceed at approximately 140° C. for approximately 40 minutes to obtain a super absorbent polymer that had undergone surface crosslinking.

After the surface crosslinking step, the super absorbent polymer that had undergone surface crosslinking was classified using a standard sieve according to the ASTM standard to produce a super absorbent polymer having a particle diameter of approximately 150 m to approximately 850 m.

Comparative Example 3

(Step 1: Polymer Producing Step)

In a 5 L glass container equipped with a stirrer and thermometer, 1,500 g of acrylic acid, 3.75 g of pentaerythritol triallyl ether (PETTAE) as an internal crosslinking agent, and 3,400 g of water were stirred and mixed and then allowed to react while maintained at approximately 5° C. Nitrogen was introduced at approximately 1,000 cc/min into the glass container containing the above mixture for 1 hour to allow the glass container to be replaced with nitrogen conditions. Next, 30.0 g of a 0.3% aqueous hydrogen peroxide solution, 15.0 g of a 1% aqueous ascorbic acid solution, and 45.0 g of a 2% aqueous solution of 2,2'-azobis-(2-amidinopropane)dihydrochloric acid were added thereto as polymerization initiators, and at the same time, 22.5 g of a 0.01% aqueous solution of iron sulfate was added thereto as a reducing agent, whereby polymerization was initiated. After the temperature of the mixture reached approximately 85° C., polymerization was carried out at approximately 90° C.±2° C. for about approximately 6 hours to obtain a polymer.

(Steps 2 and 3: Micronization and Neutralization Steps)

100 g of a 0.45 wt % aqueous solution of glycerol monolaurate (GML) was added to 5,000 g of the polymer obtained in the step 1. Thereafter, using a screw-type extruder mounted in the inside of a cylindrical pulverizer, the recovered hydrous gel polymer was extruded three times at a rotation speed of approximately 250 rpm onto a perforated plate having a plurality of holes of approximately 10 mm, whereby an additional pulverization process was carried out. According to each step for the screw-type extruder, 1,383 g of a 50% NaOH aqueous solution (the step 3: neutralization step) was added to neutralize some of the acidic groups of the polymer, and then each of 100 g of the fine powder (the additional additive addition step) and 162 g of a 10% $Na_2SO_4$ aqueous solution (the additional additive addition step) was added to produce particles of the hydrous super absorbent polymer (=micronized and neutralized polymer).

(Step 4: Drying Step)

1,000 g of the particles of the hydrous super absorbent polymer were charged into a dryer including a perforated plate configured to be capable of carrying out the transition of air flow upward or downward. To make the water content of the dried super absorbent polymer approximately 10%, hot air at approximately 200° C. and hot air at approximately 100° C. were allowed to sequentially flow from top to bottom for approximately 5 minutes and approximately 10 minutes, respectively, and then hot air at approximately 100° C. was again allowed to flow from bottom to top for 15 minutes to dry the polymer uniformly.

(Step 5: Pulverization and Classification Steps)

The dried body was pulverized using a pulverizer (GRAN-U-LIZER™ MPE) and then classified using a standard sieve according to the ASTM standard to obtain a base resin powder having a size of approximately 150 to approximately 850 m.

(Surface Crosslinking Step)

Next, an aqueous surface crosslinking agent solution containing, per 100 g of the base resin powder, 3.5 g of water, 5 g of methanol, and 0.12 g of ethylene glycol diglycidyl ether (EJ-1030S), was sprayed and stirred at ordinary temperature to carry out mixing so that the surface crosslinking solution was uniformly distributed on the super absorbent polymer powder. Subsequently, the base resin powder mixed with the surface crosslinking solution was placed in a surface crosslinking reactor to allow a surface crosslinking reaction to proceed. In this surface crosslinking reactor, the surface crosslinking reaction of the base resin powder was allowed to proceed at approximately 140° C. for approximately 40 minutes to obtain a super absorbent polymer that had undergone surface crosslinking.

After the surface crosslinking step, the super absorbent polymer that had undergone surface crosslinking was classified using a standard sieve according to the ASTM standard to produce a super absorbent polymer having a particle diameter of approximately 150 m to approximately 850 m.

Comparative Example 4

(Step 1: Polymer Producing Step)

In a 5 L glass container equipped with a stirrer and thermometer, 1,500 g of acrylic acid, 3.0 g of pentaerythritol triallyl ether (PETTAE) as an internal crosslinking agent, and 3,399 g of water were stirred and mixed and then allowed to react while maintained at approximately 5° C. Nitrogen was introduced at approximately 1,000 cc/min into the glass container containing the above mixture for approximately 1 hour to allow the glass container to be replaced with nitrogen conditions. Next, 30.0 g of a 0.3% aqueous hydrogen peroxide solution, 15.0 g of a 1% aqueous ascorbic acid solution, and 45.0 g of a 2% aqueous solution of 2,2'-azobis-(2-amidinopropane)dihydrochloric acid were added thereto as polymerization initiators, and at the same time, 22.5 g of a 0.01% aqueous solution of iron sulfate was added thereto as a reducing agent, whereby polymerization was initiated. After the temperature of the mixture reached approximately 85° C., polymerization was carried out at approximately 90° C.±2° C. for about 6 hours to obtain a polymer.

(Steps 2 and 3: Micronization and Neutralization Steps)

100 g of a 0.45 wt % aqueous solution of glycerol monolaurate (GML) was added to 5,000 g of the polymer obtained in the step 1. Thereafter, using a screw-type extruder mounted in the inside of a cylindrical pulverizer, the recovered hydrous gel polymer was extruded three times at a rotation speed of approximately 250 rpm onto a perforated plate having a plurality of holes of approximately 10 mm, whereby an additional pulverization process was carried out. According to each step for the screw-type extruder, 1,140 g of a 50% NaOH aqueous solution (the step 3: neutralization step) was added to neutralize some of the acidic groups of the polymer, and then each of 100 g of the fine powder (the additional additive addition step) and 162 g of a 10% $Na_2SO_4$ aqueous solution (the additional additive addition step) was added to produce particles of the hydrous super absorbent polymer (=micronized and neutralized polymer).

(Step 4: Drying Step)

1,000 g of the particles of the hydrous super absorbent polymer were charged into a dryer including a perforated plate configured to be capable of carrying out the transition of air flow upward or downward. To make the water content of the dried super absorbent polymer approximately 10%, hot air at approximately 200° C. and hot air at approximately 100° C. were allowed to sequentially flow from top to bottom for approximately 5 minutes and approximately 10 minutes, respectively, and then hot air at approximately 100° C. was again allowed to flow from bottom to top for approximately 15 minutes to dry the polymer uniformly.

(Step 5: Pulverization and Classification Steps)

The dried body was pulverized using a pulverizer (GRAN-U-LIZER™, MPE) and then classified using a standard sieve according to the ASTM standard to obtain a base resin powder having a size of approximately 150 to approximately 850 μm.

(Surface Crosslinking Step)

Next, an aqueous surface crosslinking agent solution containing, per 100 g of the base resin powder, 5 g of water, 6 g of methanol, 0.15 g of ethylene carbonate, and 0.38 g of aluminum sulfate, was sprayed and stirred at ordinary temperature to carry out mixing so that the surface crosslinking solution was uniformly distributed on the super absorbent polymer powder. Subsequently, the base resin powder mixed with the surface crosslinking solution was placed in a surface crosslinking reactor to allow a surface crosslinking reaction to proceed. In this surface crosslinking reactor, the surface crosslinking reaction of the base resin powder was allowed to proceed at approximately 185° C. for approximately 50 minutes to obtain a super absorbent polymer that had undergone surface crosslinking.

After the surface crosslinking step, the super absorbent polymer that had undergone surface crosslinking was classified using a standard sieve according to the ASTM standard to produce a super absorbent polymer having a particle diameter of approximately 150 m to approximately 850 m.

Comparative Example 5

(Step 1: Polymer Producing Step)

In a 5 L glass container equipped with a stirrer and thermometer, 1,450 g of acrylic acid, 3.63 g of pentaerythritol triallyl ether (PETTAE) as an internal crosslinking agent, and 3,454 g of water were stirred and mixed and then allowed to react while maintained at approximately 5° C. Nitrogen was introduced at approximately 1,000 cc/min into the glass container containing the above mixture for approximately 1 hour to allow the glass container to be replaced with nitrogen conditions. Next, 29.0 g of a 0.3% aqueous hydrogen peroxide solution, 14.5 g of a 1% aqueous ascorbic acid solution, and 43.5 g of a 2% aqueous solution of 2,2'-azobis-(2-amidinopropane)dihydrochloric acid were added thereto as polymerization initiators, and at the same time, 21.75 g of a 0.01% aqueous solution of iron sulfate was added thereto as a reducing agent, whereby polymerization was initiated. After the temperature of the mixture reached approximately 85° C., polymerization was carried out at approximately 90° C.±2° C. for approximately 6 hours to obtain a polymer.

(Steps 2 and 3: Micronization and Neutralization Steps)

96 g of a 0.45 wt % aqueous solution of glycerol monolaurate (GML) was added to 5,000 g of the polymer obtained in the step 1. Thereafter, using a screw-type extruder mounted in the inside of a cylindrical pulverizer, the recovered hydrous gel polymer was extruded three times at a rotation speed of approximately 250 rpm onto a perforated plate having a plurality of holes of approximately 10 mm, whereby an additional pulverization process was carried out. According to each step for the screw-type extruder, 1,417 g of a 50% NaOH aqueous solution (the step 3: neutralization step) was added to neutralize some of the acidic groups of the polymer, and then each of 100 g of the fine powder (the additional additive addition step) and 159 g of a 10% $Na_2SO_4$ aqueous solution (the additional additive addition step) was added to produce particles of the hydrous super absorbent polymer (=micronized and neutralized polymer).

(Step 4: Drying Step)

1,000 g of the particles of the hydrous super absorbent polymer were charged into a dryer including a perforated plate configured to be capable of carrying out the transition of air flow upward or downward. To make the water content of the dried super absorbent polymer approximately 10%, hot air at approximately 200° C. and hot air at approximately 100° C. were allowed to sequentially flow from top to bottom for approximately 5 minutes and approximately 10 minutes, respectively, and then hot air at approximately 100° C. was again allowed to flow from bottom to top for approximately 15 minutes to dry the polymer uniformly.

(Step 5: Pulverization and Classification Steps)

The dried body was pulverized using a pulverizer (GRAN-U-LIZER™ MPE) and then classified using a standard sieve according to the ASTM standard to obtain a base resin powder having a size of approximately 150 to approximately 850 μm.

(Surface Crosslinking Step)

Next, an aqueous surface crosslinking agent solution containing, per 100 g of the base resin powder, 3.5 g of water, 5 g of methanol, and 0.1 g of ethylene glycol diglycidyl ether (EJ-1030S), was sprayed and stirred at ordinary temperature to carry out mixing so that the surface crosslinking solution was uniformly distributed on the super absorbent polymer powder. Subsequently, the base resin powder mixed with the surface crosslinking solution was placed in a surface crosslinking reactor to allow a surface crosslinking reaction to proceed. In this surface crosslinking reactor, the surface crosslinking reaction of the base resin powder was allowed to proceed at approximately 140° C. for 40 minutes to obtain a super absorbent polymer that had undergone surface crosslinking.

After the surface crosslinking step, the super absorbent polymer that had undergone surface crosslinking was classified using a standard sieve according to the ASTM standard to produce a super absorbent polymer having a particle diameter of approximately 150 m to approximately 850 m.

Comparative Example 6

(Step 1: Polymer Producing Step)

In a 5 L glass container equipped with a stirrer and thermometer, 1,400 g of acrylic acid, 2.8 g of pentaerythritol triallyl ether (PETTAE) as an internal crosslinking agent, and 3,506 g of water were stirred and mixed and then allowed to react while maintained at approximately 5° C. Nitrogen was introduced at approximately 1,000 cc/min into the glass container containing the above mixture for approximately 1 hour to allow the glass container to be replaced with nitrogen conditions. Next, 28.0 g of a 0.3% aqueous hydrogen peroxide solution, 14.0 g of a 1% aqueous ascorbic acid solution, and 42.0 g of a 2% aqueous solution of 2,2'-azobis-(2-amidinopropane)dihydrochloric acid were added thereto as polymerization initiators, and at the same time, 21.0 g of a 0.01% aqueous solution of iron sulfate was added thereto as a reducing agent, whereby polymerization was initiated. After the temperature of the mixture reached approximately 85° C., polymerization was carried out at approximately 90° C.±2° C. for approximately 6 hours to obtain a polymer.

(Steps 2 and 3: Micronization and Neutralization Steps)

279 g of a 0.45 wt % aqueous solution of glycerol monolaurate (GML) was added to 5,000 g of the polymer obtained in the step 1. Thereafter, using a screw-type extruder mounted in the inside of a cylindrical pulverizer, the recovered hydrous gel polymer was extruded three times at a rotation speed of approximately 250 rpm onto a perforated plate having a plurality of holes of approximately 10 mm, whereby an additional pulverization process was carried out. According to each step for the screw-type extruder, 1,027 g of a 50% NaOH aqueous solution (the step 3: neutralization step) was added to neutralize some of the acidic groups of the polymer, and then each of 100 g of the fine powder (the additional additive addition step) and 149 g of a 10% $Na_2SO_4$ aqueous solution (the additional additive addition step) was added to produce particles of the hydrous super absorbent polymer (=micronized and neutralized polymer).

(Step 4: Drying Step)

1,000 g of the particles of the hydrous super absorbent polymer were charged into a dryer including a perforated plate configured to be capable of carrying out the transition of air flow upward or downward. To make the water content of the dried super absorbent polymer approximately 10%, hot air at approximately 200° C. and hot air at approximately 100° C. were allowed to sequentially flow from top to bottom for approximately 5 minutes and approximately 10 minutes, respectively, and then hot air at approximately 100° C. was again allowed to flow from bottom to top for approximately 15 minutes to dry the polymer uniformly.

(Step 5: Pulverization and Classification Steps)

The dried body was pulverized using a pulverizer (GRAN-U-LIZER™, MPE) and then classified using a standard sieve according to the ASTM standard to obtain a base resin powder having a size of approximately 150 to approximately 850 μm.

(Surface Crosslinking Step)

Next, an aqueous surface crosslinking agent solution containing, per 100 g of the base resin powder, 3.5 g of water, 5 g of methanol, 0.15 g of ethylene carbonate, and 0.2 g of aluminum sulfate, was sprayed and stirred at ordinary temperature to carry out mixing so that the surface crosslinking solution was uniformly distributed on the super absorbent polymer powder. Subsequently, the base resin powder mixed with the surface crosslinking solution was placed in a surface crosslinking reactor to allow a surface crosslinking reaction to proceed. In this surface crosslinking reactor, the surface crosslinking reaction of the base resin powder was allowed to proceed at approximately 185° C. for approximately 50 minutes to obtain a super absorbent polymer that had undergone surface crosslinking.

After the surface crosslinking step, the super absorbent polymer that had undergone surface crosslinking was classified using a standard sieve according to the ASTM standard to produce a super absorbent polymer having a particle diameter of approximately 150 m to approximately 850 m.

Comparative Example 7

(Step 1: Polymer Producing Step)

In a 5 L glass container equipped with a stirrer and thermometer, 1,400 g of acrylic acid, 2.8 g of pentaerythritol triallyl ether (PETTAE) as an internal crosslinking agent, and 3,506 g of water were stirred and mixed and then allowed to react while maintained at approximately 5° C. Nitrogen was introduced at approximately 1,000 cc/min into the glass container containing the above mixture for approximately 1 hour to allow the glass container to be replaced with nitrogen conditions. Next, 28.0 g of a 0.3% aqueous hydrogen peroxide solution, 14.0 g of a 1% aqueous ascorbic acid solution, and 42.0 g of a 2% aqueous solution of 2,2'-azobis-(2-amidinopropane)dihydrochloric acid were added thereto as polymerization initiators, and at the same time, 21.0 g of a 0.01% aqueous solution of iron sulfate was added thereto as a reducing agent, whereby polymerization was initiated. After the temperature of the mixture reached approximately 85° C., polymerization was carried out at approximately 90° C.±2° C. for about 6 hours to obtain a polymer.

(Steps 2 and 3: Micronization and Neutralization Steps)

279 g of a 0.45 wt % aqueous solution of glycerol monolaurate (GML) was added to 5,000 g of the polymer obtained in the step 1. Thereafter, using a screw-type extruder mounted in the inside of a cylindrical pulverizer, the recovered hydrous gel polymer was extruded three times at a rotation speed of approximately 250 rpm onto a perforated plate having a plurality of holes of approximately 10 mm, whereby an additional pulverization process was carried out. According to each step for the screw-type extruder, 1,027 g of a 50% NaOH aqueous solution (the step 3: neutralization step) was added to neutralize some of the acidic groups of the polymer, and then each of 100 g of the fine powder (the additional additive addition step) and 149 g of a 10% $Na_2SO_4$ aqueous solution (the additional additive addition step) was added to produce particles of the hydrous super absorbent polymer (=micronized and neutralized polymer).

(Step 4: Drying Step)

1,000 g of the particles of the hydrous super absorbent polymer were charged into a dryer including a perforated plate configured to be capable of carrying out the transition of air flow upward or downward. To make the water content of the dried super absorbent polymer approximately 10%, hot air at approximately 200° C. and hot air at approximately 100° C. were allowed to sequentially flow from top to bottom for approximately 5 minutes and approximately 10 minutes, respectively, and then hot air at approximately 100° C. was again allowed to flow from bottom to top for approximately 15 minutes to dry the polymer uniformly.

(Step 5: Pulverization and Classification Steps)

The dried body was pulverized using a pulverizer (GRAN-U-LIZER™ MPE) and then classified using a standard sieve according to the ASTM standard to obtain a base resin powder having a size of approximately 150 to approximately 850 μm.

(Surface Crosslinking Step)

Next, an aqueous surface crosslinking agent solution containing, per 100 g of the base resin powder, 4.5 g of water, 5 g of methanol, 0.1 g of ethylene glycol diglycidyl ether (EJ-1030S), and 0.4 g of aluminum sulfate, was sprayed and stirred at ordinary temperature to carry out mixing so that the surface crosslinking solution was uniformly distributed on the super absorbent polymer powder. Subsequently, the base resin powder mixed with the surface crosslinking solution was placed in a surface crosslinking reactor to allow a surface crosslinking reaction to proceed. In this surface crosslinking reactor, the surface crosslinking reaction of the base resin powder was allowed to proceed at approximately 140° C. for approximately 40 minutes to obtain a super absorbent polymer that had undergone surface crosslinking.

After the surface crosslinking step, the super absorbent polymer that had undergone surface crosslinking was classified using a standard sieve according to the ASTM standard to produce a super absorbent polymer having a particle diameter of approximately 150 m to approximately 850 m.

Experimental Example

The physical properties of each of the super absorbent polymers produced in Examples and Comparative Examples described above were evaluated in the following methods and are listed in Table 1 below.

Unless otherwise indicated, all of the following evaluations of the physical properties were carried out at a constant temperature and constant humidity (approximately 23° C.±1° C., relative humidity: approximately 50%±10%), and physiological saline or salt water means a approximately 0.9% by weight sodium chloride (NaCl) aqueous solution.

A sample specimen to be measured was left under constant temperature and constant humidity conditions for approximately 24 hours, and then each of the physical properties was evaluated.

In addition, unless otherwise indicated, the evaluation of physical properties of the final super absorbent polymer that had undergone surface crosslinking was carried out using a resin having a particle diameter of approximately 150 μm to approximately 850 μm, which was classified through a sieve according to the ASTM standard.

(1) Measurement of Convexity and Solidity of Particles of Super Absorbent Polymer The convexity and solidity of each of the super absorbent polymers of Examples and Comparative Examples described above were measured with morphologi 4 from Malvern Panalytical according to the following method.

1) Specimen preparation: 1 g of a particle specimen of a super absorbent polymer to be measured was prepared. In this case, in order to measure the convexity and solidity of particles having a particle diameter of approximately 300 μm to approximately 600 μm, a super absorbent polymer was classified, using a particle classifier from Retsch GmbH at an amplitude of approximately 1.0 for approximately 10 minutes, to prepare approximately 1 g of a specimen, which was separated as individual particles having a particle diameter of approximately 300 μm to approximately 600 μm without damage to the particles. The setting value of the Sample Dispersion Unit in this case is shown in FIG. 1.

Figure 2:
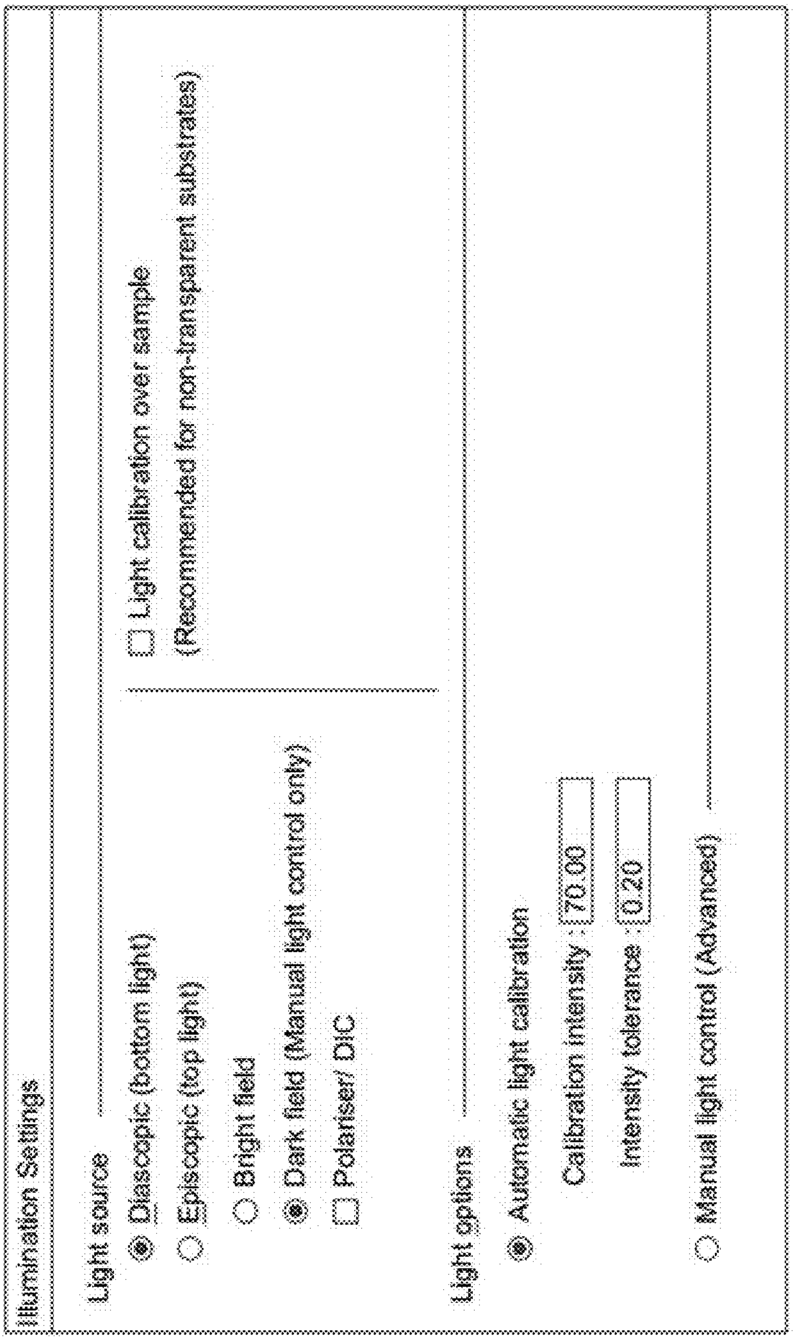
FIG. 2 shows setting values for Illumination in the morphologi 4 from Malvern Panalytical.
Figure 3:
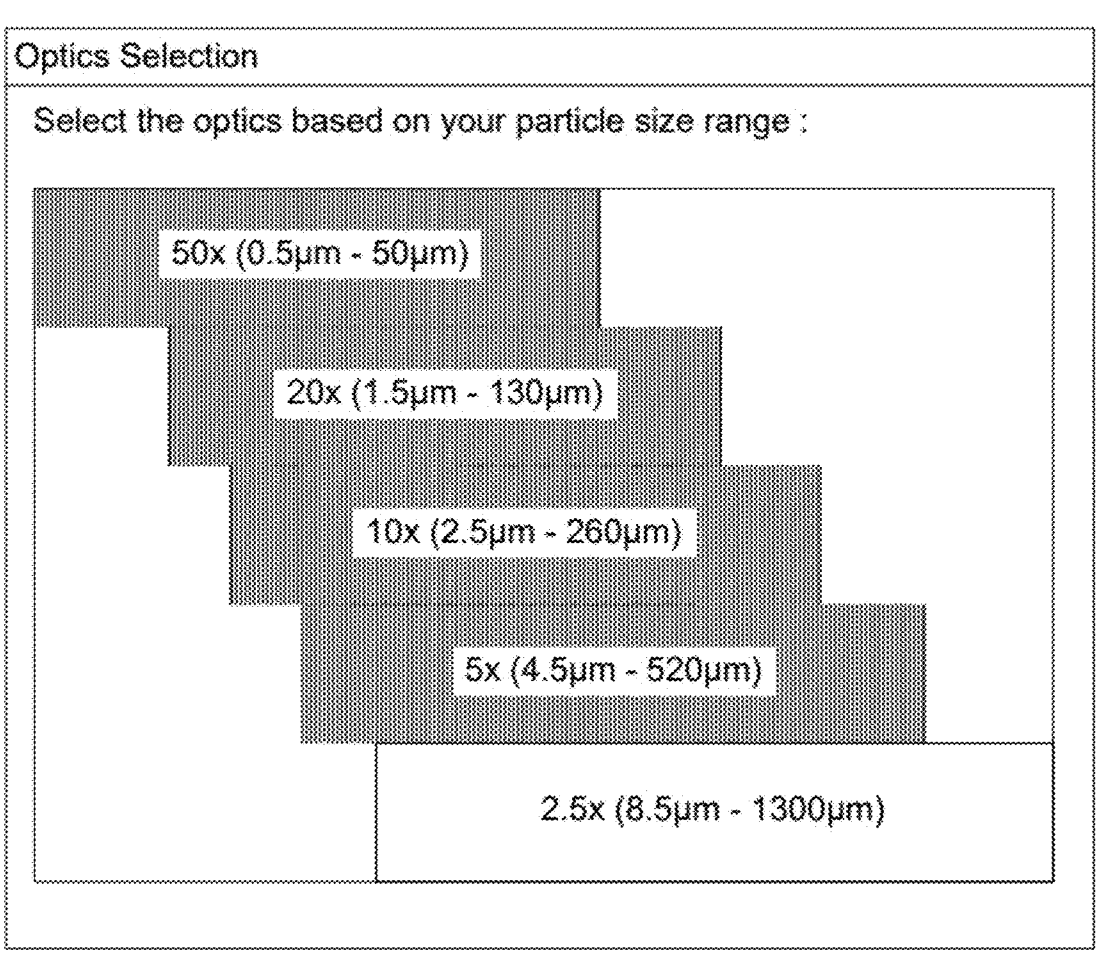
FIG. 3 shows setting values for Optics Selection in the morphologi 4 from Malvern Panalytical.

2) Image acquisition: The prepared specimen was set on the stage in the equipment and then scanned at a magnification of approximately 2.5 to obtain images of individual particles. In this case, the Illumination Setting value and the Optics Selection setting value are shown in FIG. 2 and FIG. 3, respectively.

Figure 4:
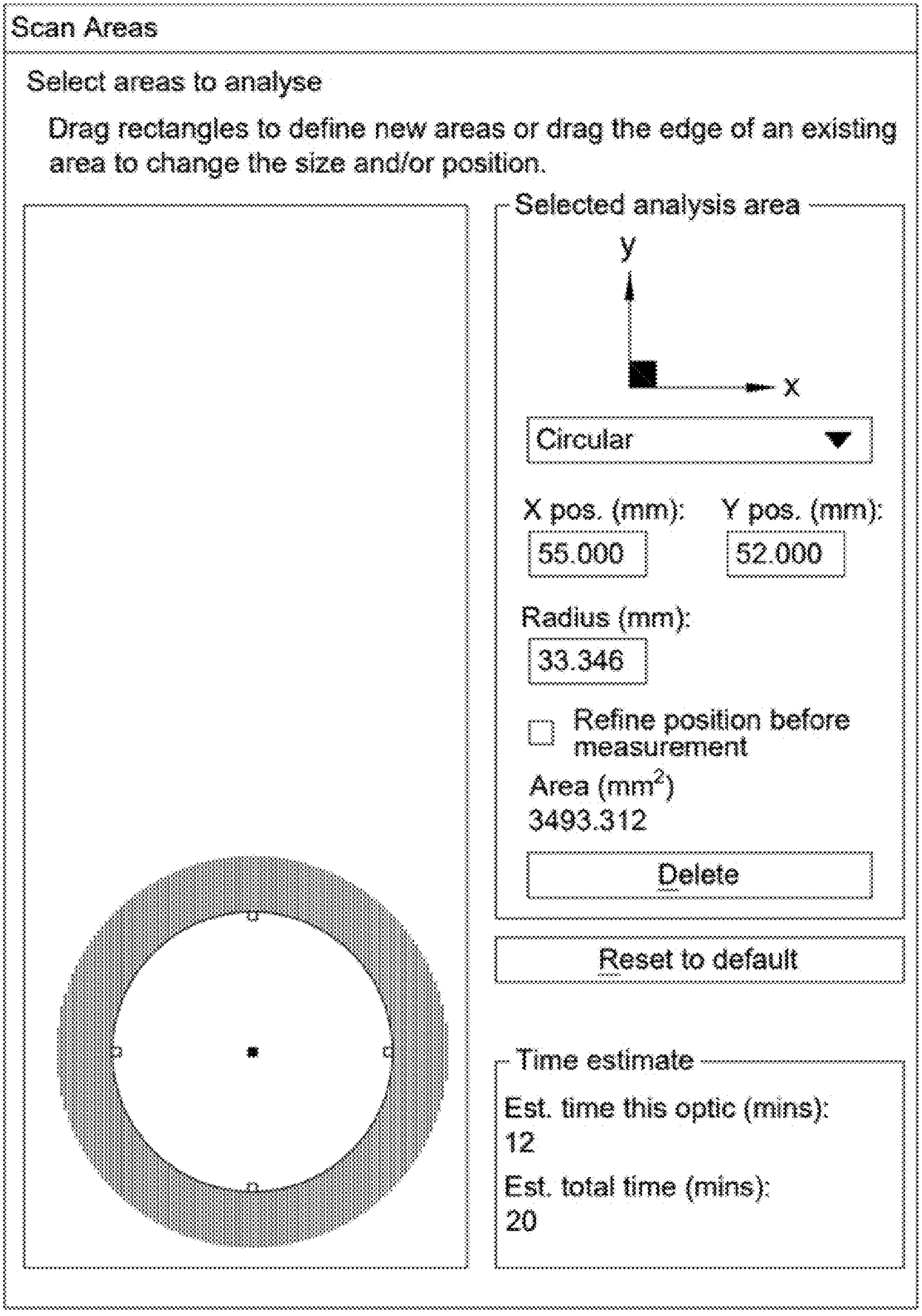
FIG. 4 shows setting values for Scan Area in the morphologi 4 from Malvern Panalytical.

3) Image processing: For the acquired images, parameter values of the circle equivalent diameter (CE diameter), the shortest diameter, the longest diameter, the perimeter of the actual particle, the perimeter of the convex outer surface (convex hull perimeter), and the like were measured in an image of each particle, where the image was obtained by capturing a 2D image of the three-dimensional particle to be measured. In this case, the Scan Area setting value is as shown in FIG. 4, and the measurement was performed without setting the Filtering value for the particle.

4) Based on the data analyzed for each particle, the shape data values for all particles included in the sample are obtained.

TABLE 1

| | Average of convexity | Average of solidity | Average of CE diameter (μm) |
|---|---|---|---|
| Example 1 | 0.87 | 0.85 | 245 |
| Example 2 | 0.88 | 0.88 | 312 |
| Example 3 | 0.89 | 0.88 | 301 |
| Example 4 | 0.92 | 0.94 | 301 |
| Example 5 | 0.87 | 0.86 | 284 |
| Example 6 | 0.88 | 0.89 | 309 |
| Comparative Example 1 | 0.93 | 0.91 | 422 |
| Comparative Example 2 | 0.93 | 0.92 | 445 |
| Comparative Example 3 | 0.95 | 0.93 | 521 |
| Comparative Example 4 | 0.97 | 0.95 | 481 |
| Comparative Example 5 | 0.96 | 0.94 | 444 |
| Comparative Example 6 | 0.96 | 0.94 | 475 |
| Comparative Example 7 | 0.97 | 0.95 | 463 |

TABLE 2

| | | Example 1 | Example 4 |
|---|---|---|---|
| Average of convexity | Particles of 300 to 600 μm | 0.83 | 0.90 |
| | All particles | 0.87 | 0.92 |
| Ratio of convexity of particles having particle diameter of 300 μm to 600 μm to convexity of all particles | | 0.95 | 0.98 |
| Average of solidity | Particles of 300 to 600 μm | 0.85 | 0.92 |
| | All particles | 0.85 | 0.94 |
| Ratio of convexity of particles having particle diameter of 300 μm to 600 μm to convexity of all particles | | 1.0 | 0.98 |

(2) Centrifuge Retention Capacity (CRC, g/g)

The water retention capacity of each of the super absorbent polymers of Examples and Comparative Examples described above in terms of absorbency multiplying factor under no load was measured according to the European Disposables and Nonwovens Association (EDANA) standard EDANA WSP 241.3

The measurement was carried out at a temperature of approximately 23±2° C. and a relative humidity of approximately 45±15% as described in EDANA WSP 241.0.

Specifically, $W_0$ (g) (approximately 0.2 g) of each of the super absorbent polymers obtained through Examples and Comparative Examples was uniformly placed in a non-woven fabric sack, sealed, and then immersed in physiological saline (0.9% by weight) at ordinary temperature. After elapse of 30 minutes, water was removed from the sack for approximately 3 minutes under conditions of approximately 250 G using a centrifuge, and the mass $W_2$ (g) of the sack was measured. In addition, the same operation was carried out without using the resin, and then a mass $W_1$ (g) at that time was measured.

Using each of the masses obtained, CRC (g/g) was calculated according to Mathematical Expression 1 below.

$$CRC(g/g) = \{[W_2(g) - W_1(g)]/W_0(g)\} - 1 \quad \text{[Mathematical Expression 1]}$$

The measurement was repeated 5 times, and the average value and the standard deviation were determined.

(3) Absorbency Under Pressure (AUP, g/g)

The absorbency under pressure of each of the super absorbent polymers of Examples and Comparative Examples described above at approximately 2.07 kPa (0.3 psi) was measured according to the EDANA method WSP 242.3.

The measurement was carried out at a temperature of approximately 23±2° C. and a relative humidity of approximately 45±15% as described in EDANA WSP 242.0.

Specifically, a stainless steel wire net of approximately 400 meshes was mounted on the bottom of a plastic cylinder having an inner diameter of approximately 25 mm. Under the conditions of ordinary temperature and approximately 50% humidity, $W_0$ (g) (0.9 g) of the super absorbent polymer was uniformly sprayed on the wire net, and a piston configured to be capable of further applying uniformly a load of approximately 2.07 kPa (0.3 psi) was installed so that the piston was slightly smaller than the outer diameter of approximately 25 mm, there was no gap between the piston and the inner wall of the cylinder, and the vertical movement of the piston was not hindered. At this time, the weight $W_3$ (g) of the device was measured.

A glass filter having a diameter of approximately 90 mm and a thickness of approximately 5 mm was placed on the inner side of a petri dish having a diameter of approximately 150 mm, and physiological saline consisting of approximately 0.9% by weight of sodium chloride was added to the same level as the upper surface of the glass filter. One sheet of filter paper having a diameter of approximately 90 mm was placed thereon. The measuring device was placed on the filter paper, and the liquid was absorbed under load for approximately 1 hour. After approximately 1 hour, the measuring device was lifted, and the weight $W_4$ (g) was measured.

Using each of the masses obtained, the absorbency under pressure (g/g) was calculated according to Expression 2 below.

$$AUP(g/g) = [W_4(g) - W_3(g)]/W_0(g) \quad \text{[Mathematical Expression 2]}$$

The measurement was repeated 5 times, and the average value and the standard deviation were determined.

(4) Vortex Time

The vortex time for each of the super absorbent polymers of Examples and Comparative Examples described above was measured as follows.

1) First, 50 mL of 0.9% salt water was added to a 100 mL beaker having a flat bottom by using a 100 mL mass cylinder.

2) Next, the beaker was placed so that it was located in the center of the magnetic stirrer, and a circular magnetic bar (diameter: approximately 30 mm) was put into the beaker.

3) Thereafter, the stirrer was operated so that the magnetic bar was stirred at approximately 600 rpm, and the lowest portion of the vortex generated by stirring was allowed to touch the top of the magnetic bar.

4) After confirming that the temperature of the salt water in the beaker has reached approximately 24.0° C., the addition of 2±0.01 g of the super absorbent polymer specimen was started, and at the same time, the stop watch was operated. Then, the time taken until the vortex disappeared and the liquid surface became completely horizontal was measured in the unit of seconds, and the measure time was defined as the vortex time.

(5) One Minute Absorption Capacity in Water Having Electrical Conductivity Value of Approximately 110 μS/Cm (EC 110 μS/Cm 1 Minute Absorption capacity)

1.0 g ($W_5$) of each of the super absorbent polymers of Examples and Comparative Examples described above was placed in a non-woven fabric sack (18 cm×28 cm) and immersed for approximately 1 minute in approximately 1,000 mL of water having an electrical conductivity value of approximately 110 μS/cm at approximately 24° C. After 1 minute, the sack was taken out from the distilled water, hung, and left for approximately 1 minute. Thereafter, the mass ($W_7$) of the sack was measured. In addition, the same operation was carried out without using the super absorbent polymer, and then a mass ($W_6$) at that time was measured. Using each of the masses obtained in this way, the absorption capacity (g/g) in water having an electrical conductivity value of approximately 110 μS/cm was calculated according to Expression 3 below.

$$\text{Absorption capacity in water having an electrical conductivity value of 110 μS/cm}=\{[W_7\,(g)-W_6\,(g)-W_5\,(g)]/W_5\,(g)\}$$ [Mathematical Expression 3]

TABLE 3

| | CRC (g/g) | AUP (g/g) | EFFC | vortex time (seconds) | 110 μS/cm 1 minute absorption capacity (g/g) |
|---|---|---|---|---|---|
| Example 1 | 38.6 | 31.5 | 35.1 | 14 | 212 |
| Example 2 | 37.4 | 31.4 | 34.4 | 19 | 204 |
| Example 3 | 36.8 | 29.8 | 33.3 | 19 | 217 |
| Example 4 | 35.3 | 33.3 | 34.3 | 27 | 186 |
| Example 5 | 37.0 | 32.1 | 34.6 | 20 | 201 |
| Example 6 | 38.4 | 30.5 | 34.5 | 13 | 217 |
| Comparative Example 1 | 28.5 | 27.5 | 28.0 | 42 | 118 |
| Comparative Example 2 | 32.8 | 28.2 | 30.5 | 45 | 105 |
| Comparative Example 3 | 36.1 | 28.9 | 32.5 | 75 | 124 |
| Comparative Example 4 | 37.0 | 29.9 | 33.5 | 90 | 81 |
| Comparative Example 5 | 37.7 | 24.7 | 31.2 | 70 | 115 |
| Comparative Example 6 | 38.8 | 31.7 | 35.3 | 102 | 91 |
| Comparative Example 7 | 44.2 | 25.2 | 34.7 | 92 | 100 |

As can be confirmed in Table 3 above, it was confirmed that by controlling the convexity and solidity in a specific range, it is possible to simultaneously improve centrifuge retention capacity and absorption performance such as absorbency under pressure while the improving absorption rate, thereby exhibiting a balance of physical properties.

According to the super absorbent polymer according to the present disclosure, it is possible to provide a super absorbent polymer in which the convexity and solidity of the particles have a predetermined value, whereby it is possible to achieve excellent quality in a case where the polymer is applied to actual products.

In particular, it is possible to provide a super absorbent polymer that, while having a fast absorption rate, simultaneously improves water retention capacity and absorption performance such as absorbency under pressure, and thus has a balance of physical properties.

In addition, in a case of being applied to sanitary goods such as diapers, it is possible to absorb discharged body fluids at a high rate, and it is also possible to absorb a relatively large amount, which makes it possible to prevent a problem that, for example, body fluids accumulate in the inside of the sanitary good or leak to the outside.

In other words, it is possible to provide a super absorbent polymer that, in a case of being applied to a product, may quickly absorb body fluids and may retain a large amount of body fluids without the body fluids leaking to the outside.

Although the super absorbent polymer and the production method thereof have been described with reference to the specific aspects, they are not limited thereto. Therefore, it will be readily understood by those skilled in the art that various modifications and changes may be made thereto without departing from the spirit and scope of the present disclosure defined by the appended claims. Therefore, it will be readily understood by those skilled in the art that various modifications and changes may be made thereto without departing from the spirit and scope of the present invention defined by the appended claims.

The invention claimed is:

1. A super absorbent polymer that is a polyacrylic acid (salt)-based super absorbent polymer, wherein the particles of the super absorbent polymer consist of the polyacrylic acid (salt)-based super absorbent polymer, and wherein for all particles of the super absorbent polymer, an average value of convexity, which is calculated according to Expression 1 below, is approximately 0.92 or less, and an average value of solidity, which is calculated according to Expression 2 below, is approximately 0.94 or less, an absorbency under pressure (AUP), which is measured at 2.07 kPa (0.3 psi) according to EDANA method WSP 242.3, is approximately 28 g/g or more, and the super absorbent polymer has a water retention capacity (CRC) of approximately 35 g/g or more, where the water retention capacity (CRC) is measured according to EDANA method WSP 241.3, convexity=convex hull perimeter/perimeter of actual particle <Expression 1> solidity=area of region surrounded by perimeter of actual particle/area of region surrounded by convex hull perimeter <Expression 2> in Expression 1, the convex hull perimeter is a length of a perimeter of a polygon of minimal perimeter that surrounds a two-dimensional image of a three-dimensional particle to be measured, and the perimeter of actual particle is a length of a perimeter of the two-dimensional image of the three-dimensional particle to be measured.

2. The super absorbent polymer according to claim 1, wherein for all the particles, the average value of convexity is approximately 0.80 to approximately 0.92.

3. The super absorbent polymer according to claim 1, wherein for all the particles, the average value of solidity is approximately 0.78 to approximately 0.94.

4. The super absorbent polymer according to claim 1, wherein a ratio of a convexity of particles having a particle diameter of approximately 300 μm to approximately 600 μm to the convexity of all the particles of the super absorbent polymer is approximately 0.9 to 1.1.

5. The super absorbent polymer according to claim 1, wherein a ratio of a solidity of particles having a particle diameter of approximately 300 μm to approximately 600 μm to the solidity of all the particles of the super absorbent polymer is approximately 0.9 to approximately 1.1.

6. The super absorbent polymer according to claim 1, wherein an average value of circle equivalent diameters (CE diameters) of the super absorbent polymer is approximately 220 μm to approximately 400 μm.

7. The super absorbent polymer according to claim 1, wherein the super absorbent polymer has an effective absorption capacity (EFFC) of approximately 30 g/g or more, where the effective absorption capacity (EFFC) is calculated according to Expression 3 below:

$$\text{effective absorption capacity } (EFFC) = \{\text{water retention capacity } (CRC) + \text{absorbency under pressure } (AUP) \text{ at } 2.07\text{ kPa}(0.3\text{ psi})/2. \quad \text{< Expression 3 >}$$

8. The super absorbent polymer according to claim 1, wherein a vortex time is approximately 40 seconds or less, where the vortex time is measured by a vortex measuring method at 24.0° C.

9. The super absorbent polymer according to claim 1, wherein when 1 g of the super absorbent polymer is swollen with water having an electrical conductivity value of 110 μS/cm for 1 minute, a maximum capacity (free swell capacity) of water that is retainable in the super absorbent polymer is approximately 170 g or more.

10. The super absorbent polymer according to claim 1, wherein a vortex time is approximately 30 seconds or less, where the vortex time is measured by a vortex measuring method at 24.0° C.

* * * * *